(12) United States Patent
Lessmann et al.

(10) Patent No.: US 12,130,353 B2
(45) Date of Patent: Oct. 29, 2024

(54) RADAR DATA PROCESSING FOR VEHICLE EGO-MOTION ESTIMATION

(71) Applicant: Aptiv Technologies AG, Schaffhausen (CH)

(72) Inventors: Stephanie Lessmann, Erkrath (DE); Uri Iurgel, Wuppertal (DE); Wolfgang Doerr, Wiehl (DE)

(73) Assignee: Aptiv Technologies AG, Schaffhausen (CH)

( * ) Notice: Subject to any disclaimer, the term of this patent is extended or adjusted under 35 U.S.C. 154(b) by 360 days.

(21) Appl. No.: 17/588,049

(22) Filed: Jan. 28, 2022

(65) Prior Publication Data
US 2022/0244372 A1  Aug. 4, 2022

(30) Foreign Application Priority Data
Jan. 29, 2021 (EP) .................................... 21154386

(51) Int. Cl.
*G01S 13/58* (2006.01)
*G01S 13/93* (2020.01)
*G01S 13/931* (2020.01)

(52) U.S. Cl.
CPC .......... *G01S 13/584* (2013.01); *G01S 13/931* (2013.01)

(58) Field of Classification Search
CPC ........ G01S 13/584; G01S 13/34; G01S 13/44; G01S 13/589; G01S 13/60; G01S 13/87; G01S 13/931; G01S 7/2883; G01S 7/356; G01S 7/415; G01S 7/41; G01S 7/42; G01S 17/931; G01S 17/42; G01S 2013/93271; G01S 2013/93272; G01S 2013/93274;

(Continued)

(56) References Cited

U.S. PATENT DOCUMENTS 9,958,541 B2 * 5/2018 Kishigami ............. G01S 13/26
10,162,046 B2 * 12/2018 Millar .................. G01S 7/4026

(Continued)

FOREIGN PATENT DOCUMENTS

DE    102019210506 A1 *  1/2021  ............. G01S 13/52
JP        2023501812 A  * 11/2020  ............. G01S 17/87

OTHER PUBLICATIONS

"Extended European Search Report", EP Application No. 21154386.3, Jul. 16, 2021, 14 pages.

(Continued)

*Primary Examiner* — Jeffrey P Aiello
(74) *Attorney, Agent, or Firm* — Harness, Dickey & Pierce, P.L.C.

(57) ABSTRACT

A method of determining ego-motion information of a vehicle comprising a radar sensor having a plurality of antenna elements, comprising: acquiring motion spectrum comprising a plurality of data elements, each calculated for a respective one of a plurality of Doppler bin indices and for a respective one of a plurality of spatial bin indices, each spatial bin index indicating a respective angle-of-arrival of a radar return signal at the radar sensor; and determining the ego-motion information by solving a motion equation system comprising equations of motion generated using the motion spectrum data and each relating a respective value indicating a radial velocity, a respective value indicating an angular displacement, and a variable indicating a velocity of the vehicle.

19 Claims, 13 Drawing Sheets

(58) Field of Classification Search
CPC ..... G01S 5/16; G01C 21/1652; G01C 21/005; G01C 21/165; G01C 21/3848; G01C 22/00; G06T 2207/30252; G06T 15/00
USPC ...... 73/1.37, 504.02; 340/8.1; 382/107, 103, 382/106, 153, 295, 312; 700/245, 61; 701/28, 523; 702/143, 150, 141, 189, 33, 702/93, 94, 104, 113, 127, 142, 152, 153, 702/181, 77, 95; 708/446
See application file for complete search history.

(56) References Cited

U.S. PATENT DOCUMENTS 10,634,777 B2 * 4/2020 Oh .................... G01S 13/08
2020/0124698 A1 * 4/2020 Noujeim ............ G01S 13/931
2020/0174096 A1 * 6/2020 Cho .................. G01S 7/414

OTHER PUBLICATIONS

Dominik Kellner, et al., "Instantaneous Ego-Motion Estimation using Doppler Radar", 2013 16th International IEEE Conference on Intelligent Transportation Systems—(ITSC 2013), 6 pages.

Dominik Kellner, et al., "Instantaneous Ego-Motion Estimation using Multiple Doppler Radars", 2014 IEEE International Conference on Robotics & Automation, 2014, pp. 1592-1597.

Frank Neitzel, et al., "Total Least Squares (TLS) im Kontext der Ausgleichung nach kleinsten Quadraten am Beispiel der ausgleichenden Geraden", 2008, pp. 141-148.

* cited by examiner

RADAR DATA PROCESSING FOR VEHICLE EGO-MOTION ESTIMATION

CROSS-REFERENCE OF RELATED APPLICATIONS

This application claims priority to European Patent Application Number 21154386.3, filed Jan. 29, 2021, the disclosure of which is hereby incorporated by reference in its entirety herein.

BACKGROUND

Many perception algorithms employed in the automotive industry require information about the ego-motion of a vehicle in order to perceive the vehicle's environment. The requirement for stable ego-motion estimation algorithms is therefore a vital part of Advance Driving Assistant Systems (ADAS) and autonomous driving applications. The vehicle's ego-motion can be measured by an Inertial Measurement Unit (IMU) or estimated using measurements acquired by other type of sensors, such as a camera or radar. However, those types of measurements often suffer from inherent errors and errors occurring due to the use of outlier measurements when estimating ego-motion.

In the article "Instantaneous ego-motion estimation using multiple Doppler radars" by Kellner D. et al., published in 2014 IEEE International Conference on Robotics and Automation (ICRA), radar detections are used to estimate the ego-motion of a travelling vehicle. The radar detections in this article are determined by first generating range-Doppler response maps and additionally applying an angle-finding algorithm on beam vectors along the antenna dimension, in order to obtain angle information for detection targets. The radial velocity and the angle information obtained for detected targets are then used in a regression analysis to estimate the vehicle ego-motion information.

SUMMARY

Example aspects herein generally relate to the field of radar data processing and, more particularly, to a techniques, methods, means for determining ego-motion information of a vehicle having a radar sensor, using motion spectrum data derived from radar data which has been generated by the radar sensor. A computer-readable storage media can include instructions that, when executed, cause a processor to perform the described techniques. A radar processing apparatus may be configured to perform the described techniques, or include means to perform processes and methods described herein.

One problem with the existing solution for estimating ego-motion information using radar detections is the highly complex process of having to first perform detection in the range-Doppler domain to identify cells in the range-domain map with high amplitude detection values, and to then additionally perform beam-forming FFT on the beam vectors corresponding to the identified cells in order to obtain angular information in the three-dimensional range-Doppler-angle domain. Furthermore, when only a few detections are available, the estimation of the ego-motion parameters cannot be accurately performed.

In view of the above, the present inventors have devised, in accordance with a first example aspect herein, a method of determining ego-motion information of a vehicle (30) comprising a radar sensor having a plurality of antenna elements, the method comprising acquiring a set of motion spectrum data which is based on radar data generated by the radar sensor, the set of motion spectrum data comprising a plurality of data elements, each of the data elements calculated for a respective Doppler bin index of a plurality of Doppler bin indices and for a respective spatial bin index of a plurality of spatial bin indices, each spatial bin index being indicative of a respective angle of arrival of a radar return signal relative to an axis of the radar sensor. The method further comprises determining the ego-motion information by solving a motion equation system comprising a plurality of equations of motion that are generated using the set of motion spectrum data, each equation of motion relating a respective value indicative of a radial velocity of a stationary object relative to the radar sensor, a respective value indicative of an angular displacement of the stationary object with respect to the axis of the radar sensor, and a variable indicative of a velocity of the vehicle. The values indicative of radial velocity in the motion equation system may be precalculated based on the Doppler bin indices and independent of the radar data, and the values indicative of the angular position in the motion equation system may be precalculated based on the spatial bin indices and independent of the radar data.

Each equation of motion may be of a form:

$$d=(-l_y \cos(\theta+\theta_M)+l_x \sin(\theta+\theta_M))\omega+\cos(\theta+\theta_M)v_x+\sin(\theta+\theta_M)v_y$$

wherein d is indicative of a radial velocity of the stationary object, $\theta$ is indicative of an angular displacement of the stationary target relative to the axis of the radar sensor, $\theta^M$ is indicative of a mounting angle of the radar sensor that is an angle between the axis of the radar sensor and an axis of a vehicle coordinate system of the vehicle, $l_x$ is indicative of a mounting position of the radar sensor along an X-axis of the vehicle coordinate system, and $l_y$ is indicative of a mounting position of the radar sensor along a Y-axis of the vehicle coordinate system, $v_x$ is indicative of an X-component of a velocity of the vehicle, and $v_y$ is indicative of a Y-component of the velocity of the vehicle, $\omega$ is indicative of a yaw rate of the vehicle, and the ego-motion information comprises values of $v_x$, $v_y$ and $\omega$.

In an embodiment where K number of radar sensors, each having a plurality of antenna elements, are mounted at K different positions on the vehicle, wherein K is an integer greater than or equal to 2, and wherein a respective set of motion spectrum data is acquired for each of the K number of radar sensors based on radar data generated by the radar sensor, determining the ego-motion information may comprise estimating the values of $v_x$, $v_y$ and $\omega$ by solving the motion equation system:

$$D = H \cdot E$$

wherein $D = \begin{bmatrix} d_1 \\ d_2 \\ \vdots \\ d_K \end{bmatrix}$, $H = \begin{bmatrix} M_1 T_1 L_1 \\ M_2 T_2 L_2 \\ \vdots \\ M_K T_K L_K \end{bmatrix}$, $E = \begin{bmatrix} \omega \\ v_x \\ v_y \end{bmatrix}$.

In the motion equation system above, $d_k=[d_{k,1}, d_{k,2}, \ldots, d_{k,F}]^T$, $k=1, 2, \ldots, K$, wherein F is an integer equal to or greater than 1, and $d_{k,1}, d_{k,2}, \ldots, d_{k,F}$, are indicative of F radial velocity values that correspond to F respective Doppler bin indices of the k-th set of motion spectrum data that is acquired for the k-th radar sensor.

Furthermore, $M_k$, k=1,2, . . . , K is a F×U dimensional matrix containing data elements of the k-th set of motion spectrum data, wherein U is an integer greater than or equal to one, and the values of F and U are respectively selected for each of k=1, 2, . . . , K, wherein each row index of $M_k$ corresponds to a respective Doppler bin index of the k-th set of motion spectrum data, and each column index of $M_k$ corresponds to a respective spatial bin index of the k-th set of motion spectrum data, wherein each row of $M_k$ comprises data elements for the corresponding Doppler bin index of the k-th set of motion spectrum data, $$T_k = \begin{bmatrix} \cos(\theta_{k,1} + \theta_k^M) & \sin(\theta_{k,1} + \theta_k^M) \\ \cos(\theta_{k,2} + \theta_k^M) & \sin(\theta_{k,2} + \theta_k^M) \\ \vdots & \vdots \\ \cos(\theta_{k,U} + \theta_k^M) & \sin(\theta_{k,U} + \theta_k^M) \end{bmatrix}, k = 1, 2, \ldots, K,$$

wherein $\theta_{k,1}, \theta_{k,2}, \ldots, \theta_{k,U}$, u=1, 2, . . . , U are indicative of U angle values that respectively correspond to U spatial bin indices of the k-th set of motion spectrum data, and wherein $\theta_k^M$ is indicative of the mounting angle for the k-th radar sensor that is an angle between an axis of the k-th radar sensor and an axis of the vehicle coordinate system of the vehicle, and $$L_k = \begin{bmatrix} -l_k^y & 1 & 0 \\ l_k^x & 0 & 1 \end{bmatrix}, k = 1, 2, \ldots,$$

K is a model matrix for the k-th radar sensor, wherein $l_k^x$ is indicative of a mounting position of the k-th radar sensor along the X-axis of the vehicle coordinate system, and $l_k^y$ is indicative of a mounting position of the k-th radar sensor along the Y-axis of the vehicle coordinate system.

In an alternative embodiment, each equation of motion may be given by:

$$d=\cos(\theta+\theta^M)v_x^s+\sin(\theta+\theta^M)v_y^s$$

wherein d is indicative of a radial velocity of the stationary object, $\theta$ is indicative of an angular displacement of the stationary target relative to the axis of the radar sensor, $\theta^M$ is indicative of an angle between the axis of the radar sensor and an axis of a vehicle coordinate system of the vehicle, $v_x^s$ is indicative of an X-component of a velocity of the radar sensor, and $v_y^s$ is indicative of a Y-component of the velocity of the radar sensor, and the ego-motion information comprises setting values $v_x=v_x^s$ and $v_y=v_y^s$ when a yaw rate of the vehicle is zero, wherein $v_x$ is indicative of an X-component of a velocity of the vehicle, and $v_y$ is indicative of a Y-component of the velocity of the vehicle.

In this alternative embodiment, when K number of radar sensors each having a plurality of antenna elements are mounted at K different positions on the vehicle, wherein K is an integer greater than or equal to 1, and wherein a respective set of motion spectrum data is acquired for each of the K number of radar sensors based on radar data generated by the radar sensor, the ego-motion information may be determined by estimating the values of $v_x^s$ and $v_y^s$ and setting $v_x=v_x^s$ and $v_y=v_y^s$, wherein estimating the values of $v_x^s$ and $v_y^s$ comprises solving the motion equation system:

$$D = H \cdot E$$

$$\text{wherein } D = \begin{bmatrix} d_1 \\ d_2 \\ \vdots \\ d_K \end{bmatrix}, H = \begin{bmatrix} M_1 T_1 \\ M_2 T_2 \\ \vdots \\ M_K T_K \end{bmatrix}, E = \begin{bmatrix} v_x^s \\ v_y^s \end{bmatrix},$$

wherein $d_k=[d_{k,1}, d_{k,2}, \ldots, d_{k,F}]^T$, k=1, 2, . . . , K, wherein F is an integer equal to or greater than 1, and $d_{k,1}, d_{k,2}, \ldots, d_{k,F}$ are indicative of F radial velocity values that correspond to F respective Doppler bin indices of the k-th set of motion spectrum data that is acquired for the k-th radar sensor, $M_k$, k=1, 2, . . . , K is a F×U dimensional matrix containing data elements of the k-th set of motion spectrum data, wherein U is an integer greater than or equal to one, and the values of F and U are respectively selected for each of k=1, 2, . . . , K, wherein each row index of $M_k$ corresponds to a respective Doppler bin index of the k-th set of motion spectrum data, and each column index of $M_k$ corresponds to a respective spatial bin index of the k-th set of motion spectrum data, wherein each row of $M_k$ comprises data elements for the corresponding Doppler bin index of the k-th set of motion spectrum data, $$T_k = \begin{bmatrix} \cos(\theta_{k,1} + \theta_k^M) & \sin(\theta_{k,1} + \theta_k^M) \\ \cos(\theta_{k,2} + \theta_k^M) & \sin(\theta_{k,2} + \theta_k^M) \\ \vdots & \vdots \\ \cos(\theta_{k,U} + \theta_k^M) & \sin(\theta_{k,U} + \theta_k^M) \end{bmatrix}, k = 1, 2, \ldots, K,$$

and $\theta_{k,1}, \theta_{k,2}, \ldots, \theta_{k,U}$, u=1, 2, . . . , U are indicative of U angle values that respectively correspond to U spatial bin indices of the k-th set of motion spectrum data, wherein $\theta_k^M$ is indicative of the mounting angle for the k-th radar sensor that is an angle between an axis of the k-th radar sensor and an axis of the vehicle coordinate system of the vehicle.

In a further alternative embodiment, each equation of motion may be given by:

$$d=(-l_y \cos(\theta+\theta^M)+l_x \sin(\theta+\theta^M))\omega+\cos(\theta+\theta^M)v_x$$

wherein d is indicative of a radial velocity of the stationary object, $\theta$ is indicative of an angular displacement of the stationary target relative to the axis of the radar sensor, $\theta^M$ is indicative of an angle between the axis of the radar sensor and an axis of a vehicle coordinate system of the vehicle, $l_x$ is indicative of a mounting position of the radar sensor along an X-axis of the vehicle coordinate system, and $l_y$ is indicative of a mounting position of the radar sensor along a Y-axis of the vehicle coordinate system, $\omega$ is indicative of a yaw rate of the vehicle, $v_x$ is an X-component of a velocity of the vehicle, wherein the ego-motion information comprises values $\omega$ and $v_x$.

In this further alternative embodiment, when K number of radar sensors each having a plurality of antenna elements are mounted at K different positions on the vehicle, wherein K is an integer greater than or equal to 1, wherein a respective set of motion spectrum data is acquired for each of the K number of radar sensors based on radar data generated by the radar sensor, the ego-motion information may be determined by estimating the values $\omega$ and $v_x$ by solving the motion equation system:

$$D = H \cdot E$$

$$\text{wherein } D = \begin{bmatrix} d_1 \\ d_2 \\ \vdots \\ d_K \end{bmatrix}, H = \begin{bmatrix} M_1 T_1 L_1 \\ M_2 T_2 L_2 \\ \vdots \\ M_K T_K L_K \end{bmatrix}, E = \begin{bmatrix} \omega \\ v_x \end{bmatrix},$$

$d_k = [d_{k,1}, d_{k,2}, \ldots, d_{k,F}]^T$, k=1, 2, . . . , K, wherein F is an integer equal to or greater than 1, and $d_{k,1}, d_{k,2}, \ldots, d_{k,F}$ are indicative of F radial velocity values that correspond to F respective Doppler bin indices of the k-th set of motion spectrum data that is acquired for the k-th radar sensor, $M_k$, k=1, 2, . . . , K is a F×U dimensional matrix containing data elements of the k-th set of motion spectrum data, wherein U is an integer greater than or equal to one, and the values of F and U are respectively selected for each of k=1, 2, . . . , K, wherein each row index of $M_k$ corresponds to a respective Doppler bin index of the k-th set of motion spectrum data, and each column index of $M_k$ corresponds to a respective spatial bin index of the k-th set of motion spectrum data, wherein each row of $M_k$ comprises data elements for the corresponding Doppler bin index of the k-th set of motion spectrum data, $$T_k = \begin{bmatrix} \cos(\theta_{k,1} + \theta_k^M) & \sin(\theta_{k,1} + \theta_k^M) \\ \cos(\theta_{k,2} + \theta_k^M) & \sin(\theta_{k,2} + \theta_k^M) \\ \vdots & \vdots \\ \cos(\theta_{k,U} + \theta_k^M) & \sin(\theta_{k,U} + \theta_k^M) \end{bmatrix}, k = 1, 2, \ldots, K,$$

$\theta_{k,1}, \theta_{k,2}, \ldots, \theta_{k,U}$, u=1, 2, . . . , U are indicative of U angle values that respectively correspond to U respective spatial bin indices of the k-th set of motion spectrum data, wherein $\theta_k^M$ is indicative of the mounting angle for the k-th radar sensor that is an angle between the axis of the k-th radar sensor and an axis of the vehicle coordinate system of the vehicle, and $$L_k = \begin{bmatrix} -l_k^y & 1 \\ l_k^x & 0 \end{bmatrix}, k = 1, 2, \ldots,$$

K is a model matrix for the k-th radar sensor, wherein $l_k^x$ is indicative of a mounting position of the k-th radar sensor along an X-axis of the vehicle coordinate system, and $l_k^y$ is indicative of a mounting position of the k-th radar sensor along a Y-axis of the vehicle coordinate system.

In the previous embodiments, the values $d_{k,1}, d_{k,2}, \ldots, d_{k,F}$ may be precalculated based the F respective Doppler bin indices of the k-th set of motion spectrum data and independent of the radar data, and the values $\theta_{k,1}, \theta_{k,2}, \ldots, \theta_{k,U}$, may be precalculated based on the U respective spatial bin indices of the k-th set of motion spectrum data and independent of the radar data.

A linear least squares estimation method may be used to solve the motion equation system to determine the ego-motion information. The ego-motion information may be determined by: randomly selecting, from the Doppler bin indices of the K sets of motion spectrum data, a plurality of subsets of Doppler bin indices; performing, for each subset of Doppler bin indices of the plurality of subsets of Doppler bin indices, processes of: estimating the ego-motion information by solving the motion equation system D=H·E using the linear least squares estimation method by setting $d_{k,1}, d_{k,2}, \ldots, d_{k,F}$ for k=1, 2, . . . , K to radial velocity values that correspond to respective Doppler bin indices of the k-th set of motion spectrum data that are in the subset of Doppler bin indices, and by setting each row of $M_k$ to data elements of a respective Doppler bin index of the k-th set of motion spectrum data that is in the subset of Doppler bin indices, determining an error of the estimation for each Doppler bin index of the subset of Doppler bin indices; and categorizing each Doppler bin index of the subset of Doppler bin indices as being one of an inlier Doppler bin index and an outlier Doppler bin index based on the determined error of estimation. The ego-motion information may be determined by further performing processes of: selecting a subset of Doppler bin indices from the plurality of subsets of Doppler bin indices based on one of a number of inlier Doppler bin indices for each subset of Doppler bin indices, and a sum of the error of estimation for all inlier Doppler bin indices determined for each subset of Doppler bin indices; and determining the ego-motion information using the linear least squares estimation method to solve the motion equation system D=H·E, by setting $d_{k,1}, d_{k,2}, \ldots, d_{k,F}$ for k=1, 2, . . . , K to radial velocity values that correspond to respective Doppler bin indices of the k-th set of motion spectrum data that are categorized as an inlier Doppler bin index in the selected subset of Doppler bin indices, and by further setting each row of $M_k$, for k=1, 2, . . . , K to data elements of a respective Doppler bin index of the k-th set of motion spectrum data that is categorized as an inlier Doppler bin index in the selected subset of Doppler bin indices.

In an example embodiment, the method may further comprise: receiving radar data comprising a respective plurality of data samples for each of a plurality of radar return signals received at each of the antenna elements of the radar sensor; processing the data samples to generate, for each of the antenna elements, respective Doppler-processed data comprising one of a plurality of data values, each of the data values calculated for a respective range bin index of a plurality of range bin indices, and for a respective Doppler bin index of the plurality of Doppler bin indices, and (ii) a plurality of data values, each of the data values calculated for a respective fast-time index of a plurality of fast-time indices, and for a respective Doppler bin index of the plurality of Doppler bin indices. Furthermore, the set of motion spectrum data is acquired by performing, for each Doppler bin index of the plurality of Doppler bin indices, processes of: selecting data values of the Doppler-processed data that have been calculated for the Doppler bin index; calculating a covariance matrix using the data values selected for the Doppler bin index; and applying a spectral estimation algorithm which uses the covariance matrix to determine, for the Doppler bin index, a respective spatial spectrum value for each of the plurality of spatial bin indices.

In the example embodiment, each of the data values of the Doppler-processed data may be calculated for a respective range bin index of a plurality of range bin indices, and for a respective Doppler bin index of a plurality of Doppler bin indices, and the data values selected for each Doppler bin index may define a R×I dimensional matrix comprising data values calculated for R antenna elements and I range bin indices for the Doppler bin index. The covariance matrix may be a R×R dimensional matrix determined from the R×I dimensional matrix using a product of the R×I dimensional matrix and a conjugate transpose of the R×I dimensional matrix.

Alternatively, in the example embodiment, each of the data values of the Doppler-processed data may be calculated for a respective fast-time index of a plurality of fast-time indices, and a respective Doppler bin index of a plurality of Doppler bin indices, and the data values selected for each Doppler bin index may define a R×I dimensional matrix that comprises data values calculated for R antenna elements and I fast-time indices for the Doppler bin index (j). The covariance matrix may be a R×R dimensional matrix determined based on R×I dimensional matrix using a product of the R×I dimensional matrix and a conjugate transpose of the R×I dimensional matrix.

In the example embodiment or any of its variants set out above, the spectral estimation algorithm may be a multiple signal classification, MUSIC, algorithm, or an estimation of signal parameters via rotational invariance techniques, ESPIRIT, algorithm.

Furthermore, generating the motion spectrum data may further comprise normalizing the spatial spectrum values determined for each Doppler bin index to generate a respective plurality of normalized spatial spectrum values, each of the normalized spatial spectrum values being generated for a respective Doppler bin index of the plurality of Doppler bin indices and for a respective spatial bin index of a plurality of spatial bin indices.

Generating the set of motion spectrum data may further comprise: calculating, for each Doppler bin index of the plurality of Doppler bin indices, data indicative of a variance of a probability distribution of the angle of arrival of the radar return signal relative to the axis of the radar sensor among the angles of arrival indicated by the respective spatial bin indices, by using the normalized spatial spectrum values generated for the spatial bin indices as probability values for the spatial bin indices; and determining a subset of Doppler bin indices of the plurality of Doppler bin indices for which the calculated variance is below a predetermined threshold, wherein the value of each data element of the motion spectrum data is based on a respective normalized spatial spectrum value that has been generated for a Doppler bin index in the subset of Doppler bin indices and for a spatial bin index corresponding to the data element. In this case, values of data elements of the set of motion spectrum data may be generated for each Doppler bin index in the subset of Doppler bin indices by processing the plurality of normalized spatial spectrum values generated for the Doppler bin index by: identifying a spatial bin index for which the normalized spatial spectrum value is highest among the normalized spatial spectrum values generated for the plurality of spatial bin indices; setting the value of a data element for the identified spatial bin index to a non-zero value; and setting the value of data elements for all other spatial bin indices to zero.

Alternatively, values of data elements of the set of motion spectrum data may be generated for each Doppler bin index in the plurality of Doppler bin indices by processing the plurality of normalized spatial spectrum values generated for the Doppler bin index by: identifying a spatial bin index for which the normalized spatial spectrum value is highest among the normalized spatial spectrum values generated for the plurality of spatial bin indices; setting the value of a data element for the identified spatial bin index to a non-zero value; and setting the value of data elements for all other spatial bin indices to zero.

Determining the ego-motion information may further comprise solving the motion equation system using a least square adjustment method, and the least square adjustment method may perform at least one iteration of an iterative process where an increment to an estimate of the ego-motion information is calculated in each iteration of the iterative process to obtain an updated estimate that is based on the estimate and the increment and used to calculate an increment in a next iteration of the iterative process, wherein the increment is calculated using (i) a first set of values for the set of motion spectrum data, each value of the first set of values being indicative of a variance of the distribution of the angle of arrival among the angles of arrival indicated by the respective spatial bin indices for a Doppler bin index of the set of motion spectrum data, wherein each value of the first set is calculated using the normalized spatial spectrum values corresponding to the plurality of spatial bin indices for the Doppler bin index as respective probability values for the plurality of spatial bin indices, and (ii) a second set of values for the set of motion spectrum data, each value of the second set of values being indicative of a variance of the distribution of the radial velocity among the radial velocities indicated by the respective Doppler bin indices for a spatial bin index of the set of motion spectrum data, wherein each value of the second set of values is calculated using the normalized spatial spectrum corresponding to the plurality of Doppler bins for the spatial bin index as respective probability values for the plurality of Doppler bin indices. An initial estimate of ego-motion information used in the iterative process may be obtained using the linear least square estimation method.

Furthermore, the present inventors have devised, in accordance with a second example aspect herein, a computer program comprising computer program instructions which, when executed by a computer processor, cause the computer processor to execute a method according to the first example aspect or any of its embodiments and variants thereof set out above. The computer program may be stored on a non-transitory computer-readable storage medium, or it may be carried by a signal, for example.

The present inventors have also devised, in accordance with a third example aspect herein, a radar data processing apparatus arranged to determine ego-motion information of a vehicle comprising a radar sensor having a plurality of antenna elements. The radar data processing apparatus comprises a motion spectrum acquisition module, which is arranged to acquire a set of motion spectrum data which is based on radar data generated by the radar sensor, the set of motion spectrum data comprising a plurality of data elements, each of the data elements calculated for a respective Doppler bin index of a plurality of Doppler bin indices and for a respective spatial bin index of a plurality of spatial bin indices, each spatial bin index being indicative of a respective angle of arrival of a radar return signal relative to an axis of the radar sensor. The radar data processing apparatus further comprises an ego-motion information determination module, which is arranged to determine the ego-motion information by solving a motion equation system comprising a plurality of equations of motion that are generated using the set of motion spectrum data, each equation of motion relating a respective value indicative of a radial velocity of a stationary object relative to the radar sensor, a respective value indicative of an angular displacement of the stationary object with respect to an axis of the radar sensor, and a variable indicative of a velocity of the vehicle.

BRIEF DESCRIPTION OF THE DRAWINGS

Example embodiments will now be explained in detail, by way of non-limiting example only, with reference to the accompanying figures described below. Like reference numerals appearing in different ones of the figures can denote identical or functionally similar elements, unless indicated otherwise.

DETAILED DESCRIPTION OF EXAMPLE EMBODIMENTS

Figure 1A:
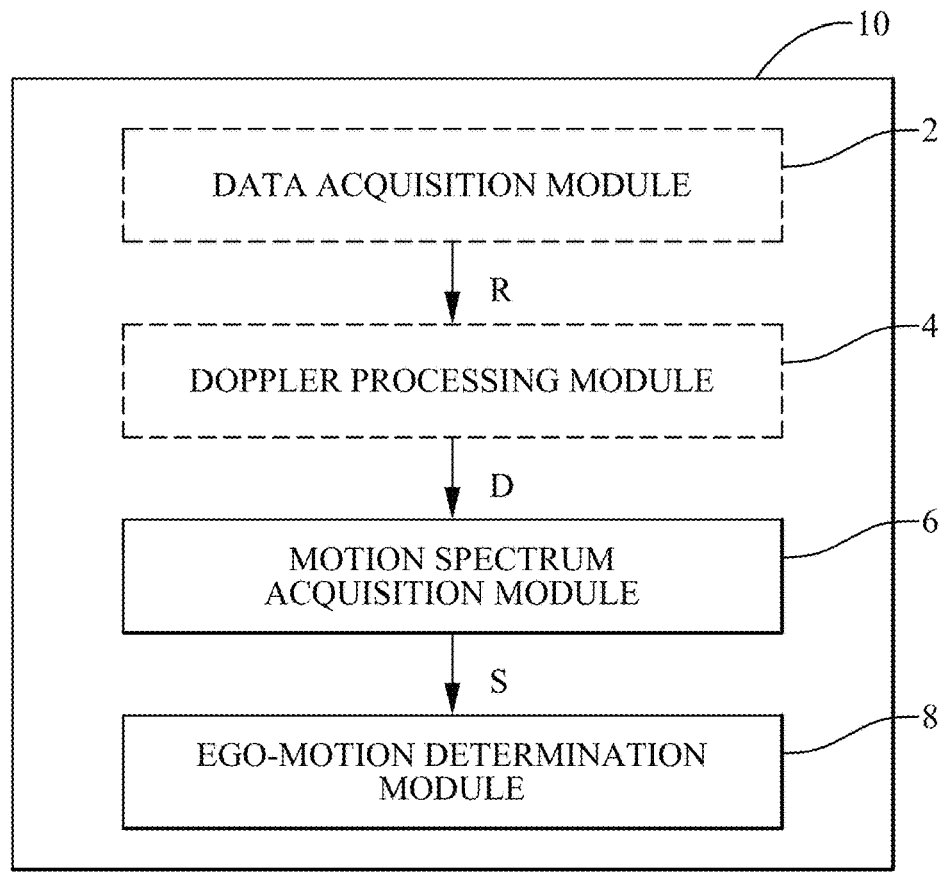
FIG. 1A is a schematic illustration of a radar data processing apparatus according to a first example embodiment.
Figure 1B:
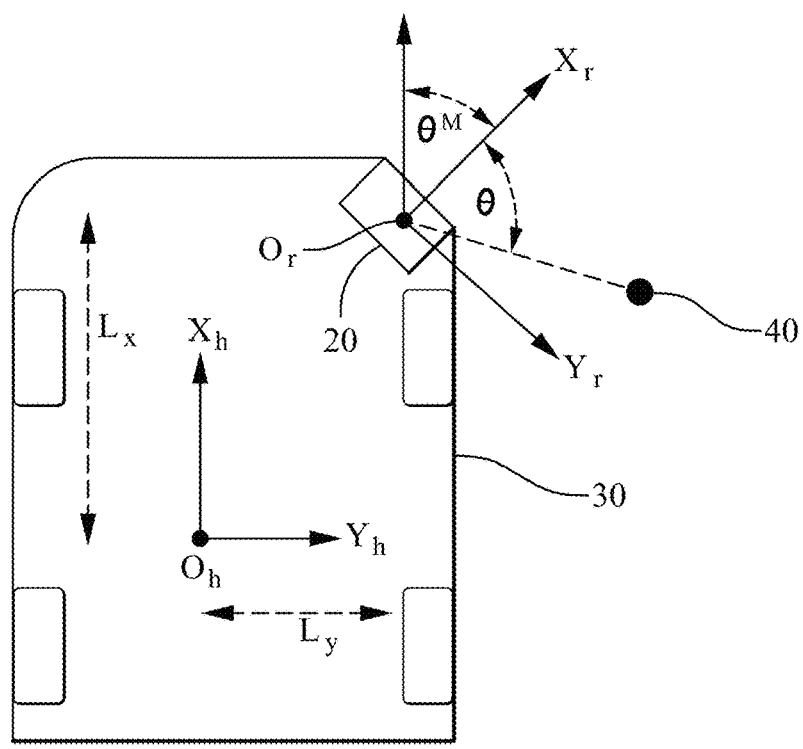
FIG. 1B is a schematic illustration of a vehicle comprising a radar sensor for generating the radar data to be processed by the radar data processing apparatus of the first example embodiment.

FIG. 1A is a schematic illustration of a radar data processing apparatus 10 according to a first example embodiment. The radar data processing apparatus 10 may, as in the present example embodiment, be arranged to process radar data obtained by a radar sensor 20 mounted on a vehicle 30, as illustrated in FIG. 1B, to generate a set of motion spectrum data S for estimating ego-motion information of the vehicle. As shown in FIG. 1, the radar data processing apparatus 10 includes a motion spectrum acquisition module 6 and an ego-motion information determination module 8. The radar data processing apparatus 10 may, as in the present example embodiment, further include a data acquisition module 2 and a Doppler-processing module 4.

As illustrated in FIG. 1B, a radar coordinate system having an origin $O_r$, an X-axis, $X_r$, and a Y-axis, $Y_r$, is associated with the radar sensor 20. The X-axis $X_r$ may, as in the present example embodiment, be aligned with a boresight of the radar sensor 20, although the boresight may in general have any orientation with respect to the axes of the radar coordinate system. Furthermore, as shown in FIG. 1B, a stationary object 40, which is within the field-of-view of the radar sensor 20, may form an angle θ with respect to an axis of the radar sensor 20, wherein θ is indicative of an angular displacement of the stationary target 40 relative to the axis of the radar sensor 20. In the present example, θ represents an azimuth angle that is formed with respect to the X-axis $X_r$ of the radar sensor 20.

As shown in FIG. 1B, the radar sensor 20 is mounted to the vehicle 30 at a position ($l_x$, $l_y$) in the vehicle's coordinate system, which is defined with respect to an origin $O_h$. $l_x$ is indicative of a mounting position of the radar sensor 20 along a first axis (e.g., the X-axis, $X_h$, in the present example) of the vehicle coordinate system, and $l_y$ is indicative of a mounting position of the radar sensor 20 along a second axis (e.g., the Y-axis, $Y_h$, in the present example) of the vehicle coordinate system. The orientation of the radar sensor 20 with respect to an axis of the vehicle coordinate system is given by its mounting angle $\theta^M$, which is indicative of a mounting angle of the radar sensor 20 that is an angle between an axis of the radar sensor 20 and an axis of the vehicle coordinate system of the vehicle 30. In the present example, mounting angle $\theta^M$ is an angle formed by the boresight (along the X-axis, $X_r$) of the radar sensor 20 with respect to the X-axis, $X_h$, of the vehicle coordinate system.

It should be understood that the coordinate system of the vehicle 30 and the coordinate system of the radar sensor 20, and the position and mounting angle of the radar sensor 20, are not limited to the example illustrated in FIG. 1B. Rather, these coordinate systems may have axes defined in any suitable manner, and the radar sensor 20 may be mounted at any suitable position with any suitable mounting angle on the host vehicle 30.

Assuming that the vehicle 30 is travelling with a yaw rate of ω and a velocity that has a X-axis component of v, (defined with respect to $X_h$ in the present example) and a Y-axis component of $v_y$ (i.e. defined with respect to $Y_h$ in the present example), the relationship between the radial velocity d of the stationary object 40 measured by the radar sensor 20, and the azimuth angle θ of stationary object (formed with respect to an axis of the radar sensor 20 as illustrated in FIG. 1B), may be given by the following formula:

$$d = (-l_y \cos(\theta + \theta_M) + l_x \sin(\theta + \theta_M))\omega + \cos(\theta + \theta_M)v_x + \sin(\theta + \theta_M)v_y \quad (1)$$

In FIG. 1B, the radial velocity measured for stationary object 40 by the radar sensor 20 is indicative of the velocity of the vehicle 30. In particular, as the radar sensor 20 moves with the vehicle 30, the stationary object 40 is observed by the radar sensor 20 to move with a velocity that is equal in amplitude to the velocity of the radar sensor 20 but in an opposite direction.

In cases where the yaw-rate of the vehicle 30 is assumed to be zero, the velocity of the vehicle 30 can be taken to be equivalent to the velocity of the radar sensor 20. In this regard, the relationship between the radial velocity d of the stationary object 40 measured by the radar sensor 20, and the azimuth angle θ of stationary object 40 may also be described by the following formula:

$$d = \cos(\theta + \theta^M) v_x^s + \sin(\theta + \theta^M) v_y^s \qquad (2)$$

where $v_x^s$ is indicative of an X-component of a velocity of the radar sensor 20, and $v_y^s$ is indicative of a Y-component of the velocity of the radar sensor 20. Accordingly, when the yaw-rate is zero or close to zero, it is possible to estimate ego-motion information of the vehicle 30 by solving radar sensor velocities $v_x^s$ and $v_y^s$ using (2) and determining the vehicle velocities to be equal to the radar sensor velocities, for example, by setting $v_x = v_x^s$ and $v_y = v_y^s$.

Furthermore, in some cases, it can be assumed that a Y-axis component of $v_y$ of the vehicle 30 velocity is zero, in which case, formula (1) above resolves into:

$$d = (-l_y \cos(\theta + \theta^M) + l_x \sin(\theta + \theta^M)) \omega + \cos(\theta + \theta^M) v_x \qquad (3)$$

The radar sensor 20 may, as in the present example embodiment, include one or more transmit antenna elements (not shown) which are configured to transmit a series of radar signals to the stationary object 40 within the vicinity of the vehicle 30. Each radar signal may, as in the present example embodiment, be a frequency-modulated signal, such as a chirp signal that varies its frequency over a predetermined bandwidth, for example. However, the radar signals may alternatively be transmitted at a fixed frequency. The radar sensor 20 may, as in the present example embodiment, further include an array of receive antenna elements (not shown), which are configured to receive radar return signals corresponding to the series of radar signals that are reflected from the stationary object 40. In the present example embodiment, the receive antenna elements form a linear, uniformly-spaced, one-dimensional array. However, the array of receive antenna elements is not limited in this regard and may alternatively form a two-dimensional array with any suitable array pattern.

The radar sensor 20 may further demodulate the received radar return signals to generate baseband (or intermediate frequency) signals, for example by mixing the radar return signals with the transmitted radar signals. The obtained baseband signals are further digitized using an analogue-to-digital converter to generate a plurality of time-domain data samples for each of the plurality of radar return signals received at each of the plurality of receive antenna elements of the radar sensor 20. Radar data R comprising the generated time-domain data samples may be further provided to radar data processing apparatus 10 to generate the set of motion spectrum data S for estimating ego-motion information of the vehicle 30, the details of which are described below.

Figure 2:
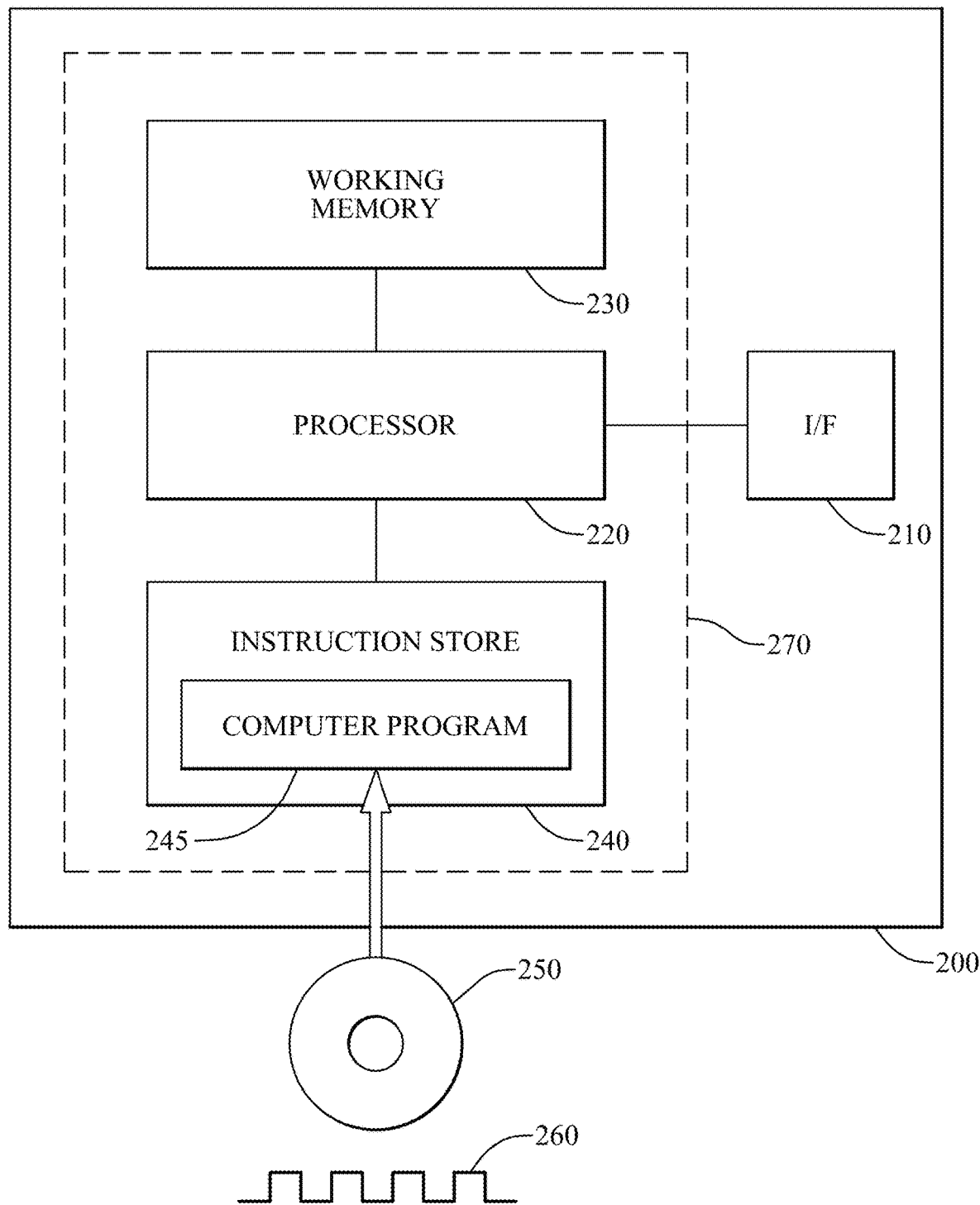
FIG. 2 illustrates an example implementation in programmable signal processing hardware of the radar data processing apparatus of the first example embodiment herein.

FIG. 2 is a schematic illustration of a programmable signal processing hardware 200, which may be configured to perform the operations of the radar processing apparatus 10 of the example embodiment.

The programmable signal processing apparatus 200 includes a communication interface (I/F) 210, for communicating with the radar sensor 20 to receive radar data therefrom. The signal processing apparatus 200 further includes a processor (e.g., a Central Processing Unit, CPU) 220, a working memory 230 (e.g., a random access memory) and an instruction store 240 storing a computer program 245 comprising computer-readable instructions which, when executed by the processor 220, cause the processor 220 to perform various functions of the radar data processing apparatus 10 described herein. The working memory 230 stores information used by the processor 220 during execution of the computer program 245. The instruction store 240 may include a ROM (e.g., in the form of an electrically-erasable programmable read-only memory (EEPROM) or flash memory) which is pre-loaded with the computer-readable instructions. Alternatively, the instruction store 240 may include a RAM or similar type of memory, and the computer-readable instructions of the computer program 245 can be input thereto from a computer program product, such as a non-transitory, computer-readable storage medium 250 in the form of a CD-ROM, DVD-ROM, etc. or a computer-readable signal 260 carrying the computer-readable instructions. In any case, the computer program 245, when executed by the processor 220, causes the processor 220 to execute a method of determining ego-motion information of the vehicle 30, and optionally also a method of generating the set of motion spectrum data S for estimating the ego motion information of the vehicle 30 described in the following. It should be noted, however, that the radar data processing apparatus 10 may alternatively be implemented in non-programmable hardware, such as an application-specific integrated circuit (ASIC).

Figure 3:
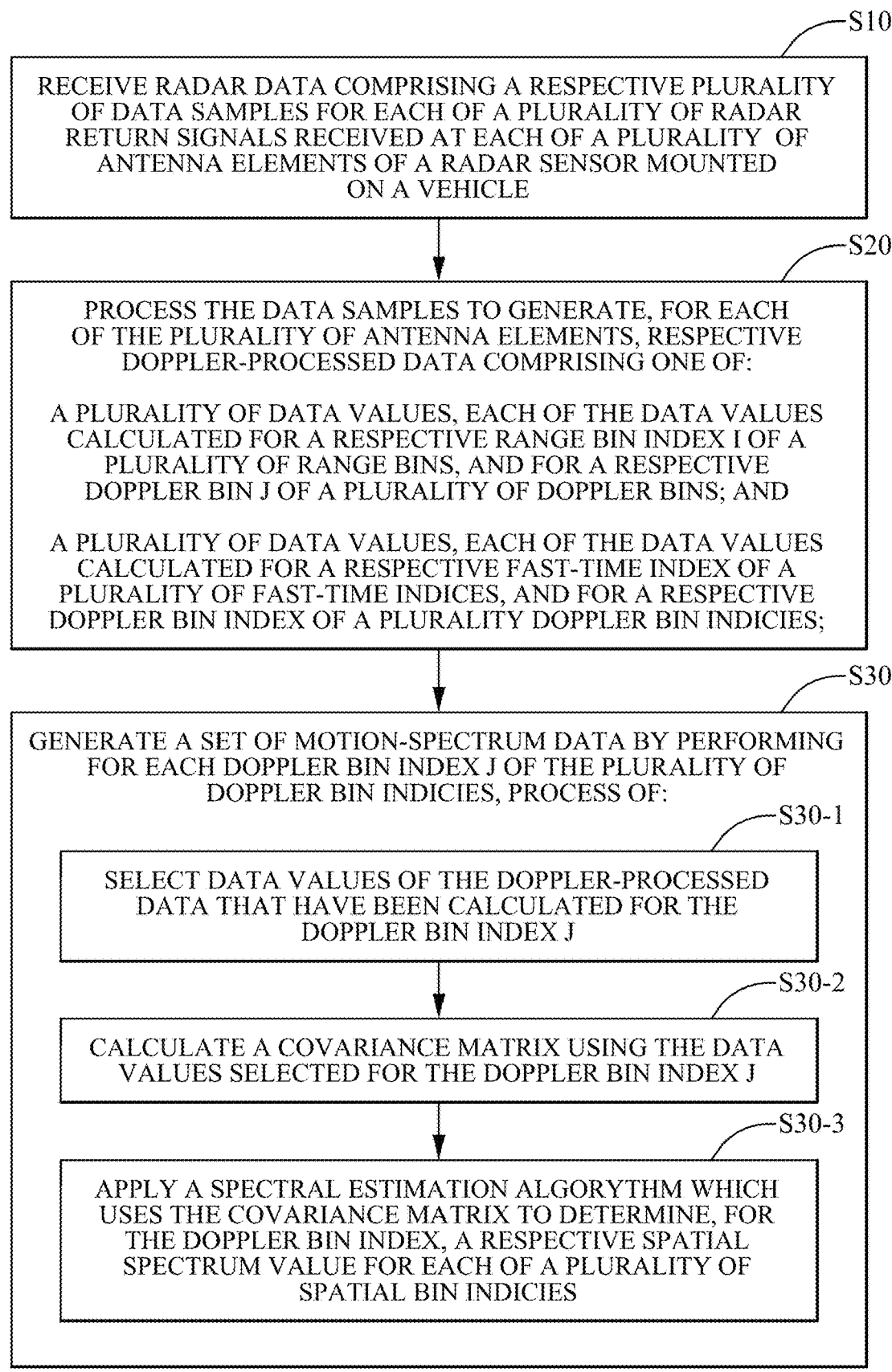
FIG. 3 is a flow diagram illustrating a method by which the radar data processing apparatus of the first example embodiment may process radar data to generate motion spectrum data for estimating vehicle ego-motion information.

FIG. 3 is a flow diagram illustrating a method by which the motion spectrum acquisition module 6 of the radar data processing apparatus 10 in FIG. 1 may acquire a set of motion spectrum data S for estimating the ego-motion information of the vehicle 30. The set of motion spectrum data is based on radar data generated by the radar sensor 20 and includes a plurality of data elements, each of the data elements calculated for a respective Doppler bin index of a plurality of Doppler bin indices and for a respective spatial bin index of a plurality of spatial bin indices. Each spatial bin index is indicative of a respective angle of arrival of a radar return signal relative to an axis of the radar sensor 20. In the example of FIG. 3, the motion spectrum acquisition module 6 acquires the set of motion spectrum data S by generating the motion spectrum data S based on radar data R provided by the radar sensor 20, as described in more detail below. However, the motion spectrum acquisition module 6 need not acquire the set of motion spectrum data in this way, and may, for example, alternatively receive the set of motion spectrum data which has been generated elsewhere in accordance with the processes described below or otherwise.

In step S10 of FIG. 2, the data acquisition module 2 receives radar data R comprising a respective plurality of data samples for each of a plurality of radar return signals received at each of the antenna elements of the radar sensor 20. The radar data R may, as in the present example embodiment, be time-domain data samples generated by the radar sensor 20, as previously described. These time-domain data samples may be represented as a three-dimensional array that defines a radar-data cube. A first dimension of the array may correspond to a "fast-time" dimension along which a plurality of data samples acquired for a single radar signal (e.g., a chirp signal) at a plurality of respective fast-time sampling intervals may be arranged. A second dimension of the array may correspond to a "slow-time" dimension, along which data samples acquired from a plurality of different radar signals (e.g., different chirp signals) at the same fast-time interval index may be arranged. A third dimension of the array may correspond to data samples acquired by a plurality of receive antenna elements, from a single radar signal (e.g., chirp signal) and for a single fast-time interval index. The received radar data R is passed to the Doppler-processing module 4.

In step S20 of FIG. 3, the Doppler-processing module 4 processes the data samples of the radar data R to generate, for each of the receive antenna elements, respective Doppler-processed data D. In the present example embodiment, the Doppler-processed data D includes a plurality of data values, each of the data values being calculated for a respective range bin index of a plurality of range bin indices, and for a respective Doppler bin index of a plurality of Doppler bin indices. The Doppler processing module 4 may, as in the present example, process the data samples to generate the Doppler-processed data D comprising the plurality of data values by performing range-FFT processing on the time-domain samples over the fast-time dimension, and further performing Doppler-FFT processing over the slow-time dimension on the output frequency-domain samples of the range-FFT processing. However, it should be understood that, in an alternative implementation, the Doppler processing module 4 may not perform the range-FFT processing on the time-domain data samples and may only perform Doppler-FFT to generate the plurality of data values. That is, in this alternative implementation, the Doppler-processed data D instead includes a plurality of data values, each calculated for a respective fast-time index of a plurality of fast-time indices, and a respective Doppler bin index of a plurality of Doppler bin indices.

In step S30 of FIG. 3, the motion spectrum acquisition module 6 generates motion spectrum data S comprising a plurality of data elements, each of the data elements being calculated for a respective Doppler bin index of the plurality of Doppler bin indices and for a respective spatial bin index of a plurality of spatial bin indices. Each spatial bin index is indicative of a respective angle of arrival of a radar return signal relative to the axis (i.e., $Y_r$ in FIG. 1B) axis of the radar sensor 20. Each spatial bin index may, as in the present example embodiment, be indicative of an azimuth angle formed with respect to the axis of the radar sensor 20. Equivalent, each spatial bin index is also indicative of a spatial frequency of a radar return signal with respect to the plurality of antenna receive elements. In particular, for an azimuth angle range of $-\pi/2$ to $\pi/2$, a one-to-one mapping exists between azimuth angle and spatial frequency.

More specifically, in step S30 of FIG. 3, the motion spectrum acquisition module 6 performs, for each Doppler bin index of the plurality of Doppler bin indices, processes of steps S30-1, S30-2 and S30-3. In step S30-1 of FIG. 3, motion spectrum acquisition module 6 selects data values of the Doppler-processed data D that have been calculated for the Doppler bin. In step S30-2 of FIG. 3, the motion spectrum acquisition module 6 calculates a covariance matrix using the data values selected for the Doppler bin. In step S30-3 of FIG. 3, the motion spectrum acquisition module 6 applies a spectral estimation algorithm which uses the covariance matrix to determine, for the Doppler bin index, a respective spatial spectrum value for each of the plurality of spatial bin indices. Accordingly, each data element of the motion spectrum data S is based on a respective spatial spectrum value that has been determined for the Doppler bin index and the spatial bin index corresponding to the data element.

Figure 4:
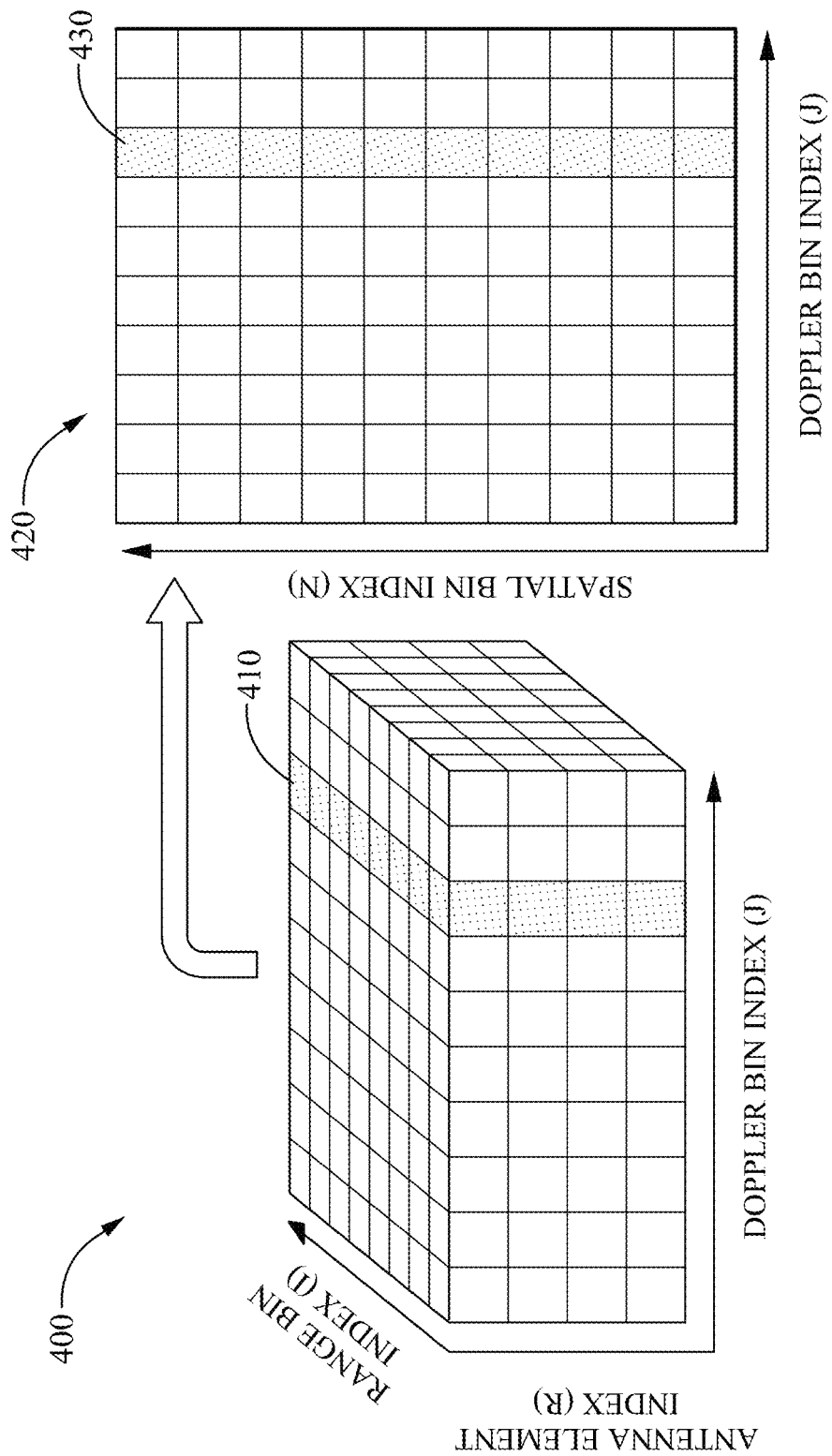
FIG. 4A illustrates an example of a radar data-cube representation of Doppler-processed data which has been generated from radar data in the first example embodiment.
FIG. 4B illustrates an example of a two-dimensional array comprising spatial spectrum values generated for each of a plurality of Doppler bin indices.

FIG. 4A illustrates a radar data-cube 400 representing data values of the Doppler-processed data D that are generated for each the plurality of antenna elements in step S20 of FIG. 3. In FIG. 4A, the radar data-cube 400 is an I×J×R dimensional array whose data elements are identified by respective ones of I range bin indices (along a range-dimension of the array), J Doppler bin indices (along a Doppler-dimension of the array), and R antenna element indices (along an antenna element dimension of the array). Each Doppler bin index is indicative of a radial velocity of a potential object relative to the radar sensor 20. Furthermore, each range bin index is indicative of a distance of a potential object from the radar sensor 20.

In the present example embodiment, the data values selected in step S30-1 of FIG. 3 for each Doppler bin index j, where j=1, 2, ... ,J, define a R×I dimensional matrix $X_j$ that includes data values (of the Doppler-processed data D) calculated for the R antenna element indices r=1, 2, ... , R and the I range bin indices i=1, 2, ... , I for the Doppler bin index j. The matrix $X_j$ thus includes I number of beam vectors, each beam vector comprising R data values corresponding R respective spatial bin indices. The covariance matrix calculated in step S30-1 of FIG. 3 may thus be a R×R dimensional covariance matrix $S_{xx}$ that is determined from matrix $X_j$ based on the product of matrix $X_j$ with the conjugate transpose of the matrix $X_j$. As a non-limiting example, the covariance matrix may be calculated as $S_{xx}=E[X_j X_j^H]-E[X_j^H]$.

However, in the case that range-FFT processing is not performed to generate the data values (that is, where each of the data values of the Doppler-processed data is calculated for a respective fast-time index of a plurality of fast-time indices, and a respective Doppler bin index of a plurality of Doppler bin indices), the data values selected for each Doppler bin index in step S30-1 of FIG. 3 define a R×I dimensional matrix that includes data values calculated for K antenna elements and I fast-time indices for the Doppler bin index, and wherein the signal covariance matrix is a R×R matrix determined from the R×I dimensional matrix using a product of the R×I dimensional matrix and a conjugate transpose of the R×I matrix.

In the present example embodiment, the motion spectrum acquisition module 6 determines the spatial spectrum values for each Doppler bin in step S30-3 of FIG. 3 by using a Multiple Signal Classification (MUSIC) algorithm as the spectral estimation algorithm. The motion spectrum acquisition module 6 may, as in the present example embodiment, use the MUSIC algorithm to compute, for each of the Doppler bin indices j=1, 2 ... ,J, a spatial spectrum value $p_{jn}$ for each of a plurality of spatial bin indices n=1, 2 ... , N by using the MUSIC spatial spectrum function:

$$P(\theta) = \frac{1}{a(\theta)^H E_N E_N^H a(\theta)} \quad (4)$$

wherein $a(\theta)$ is the steering vector of the plurality of antennas corresponding to the $\theta$ angle of arrival, and $E_N$ represents a noise subspace derived from the eigen-decomposition of covariance matrix $X_j$ for Doppler bin index j. As observable from equation (1), at most two targets can exist for each doppler bin, and therefore, one or two targets may be assumed when determining the spatial spectrum values using the MUSIC algorithm.

In some embodiments, the antenna elements of the radar sensor 20 may be calibrated, for example, to minimize amplitude and phase errors between the antenna elements. In such embodiments, a calibration matrix may be applied to the covariance matrix to generate a calibrated covariance matrix before the spectral estimation is performed using the calibrated covariance matrix.

It should be noted that each spatial bin not only maps to an angle value in the angle domain but may equivalently map to a spatial frequency value in the spatial frequency domain, since the spatial frequency ψ of a signal in a plane along which the array of antenna receive elements are arranged is dependent on the angle of arrival θ of the signal. Accordingly, in some example embodiments, the spatial spectrum values may be determined in the spatial frequency domain, wherein each spatial bin corresponds to a spatial frequency value of a signal with respective to the radar sensor 20.

Furthermore, the spectral estimation algorithm that is used to generate the spatial spectrum values in step S30-3 of FIG. 3 is not limited to a MUSIC algorithm, and may alternatively be an Estimation of Signal Parameters via Rotational Invariance Techniques (ESPIRIT) algorithm or any suitable spectral estimation algorithm that can be used to estimate the spatial spectrum or the angle of arrival of one or more radar return signals based on a covariance matrix obtained from the detected signal. Furthermore, the spectral estimation algorithms that are based on the covariance matrix of the observation assumes the signal sources to be uncorrelated. However, when some of the signals are correlated, spatial smoothing may be performed. More specifically, in some example embodiments, the motion spectrum acquisition module 6 may be arranged to determine the covariance matrix for each Doppler bin index of the plurality of Doppler bin indices by performing a spatial smoothing operation to determine covariance matrices corresponding to a plurality of sub-arrays formed from the plurality of antenna elements and generate the covariance matrix based on the covariances matrices determined for the plurality of sub-arrays.

FIG. 4B is an example illustration of a two-dimensional array 420 that includes the spatial spectrum values generated for each of the plurality of Doppler bin indices in step S30 of FIG. 3. More specifically, the two-dimensional array 420 in FIG. 4B includes J Doppler bin indices j=1, 2 . . . ,J along a first direction of the array 420, and N spatial bin indices n=1, 2 . . . , N along a second direction of the array 420. The spatial spectrum values generated for each Doppler bin index corresponds to a column 430 of the array 420. The array 420 in FIG. 4B includes a plurality of spatial spectrum values $p_{jn}$, j=1, 2 . . . ,J, n=1, 2 . . . , N, wherein each spatial spectrum value $p_{jn}$ is calculated for a Doppler bin index j and a spatial bin index n in the array 420. Furthermore, each data element of the set of motion spectrum data S is based on a respective spatial spectrum value $p_{jn}$ that has been determined for the Doppler bin index j and the spatial bin index n corresponding to the data element. As illustrated in FIG. 4B, the spatial spectrum values for a Doppler bin index j at column 430 is obtained by using the data values over range for the Doppler bin index j in the radar data-cube 400, as a single "snapshot" of the radar sensor measurement in the spectral estimation algorithm.

Figure 5:
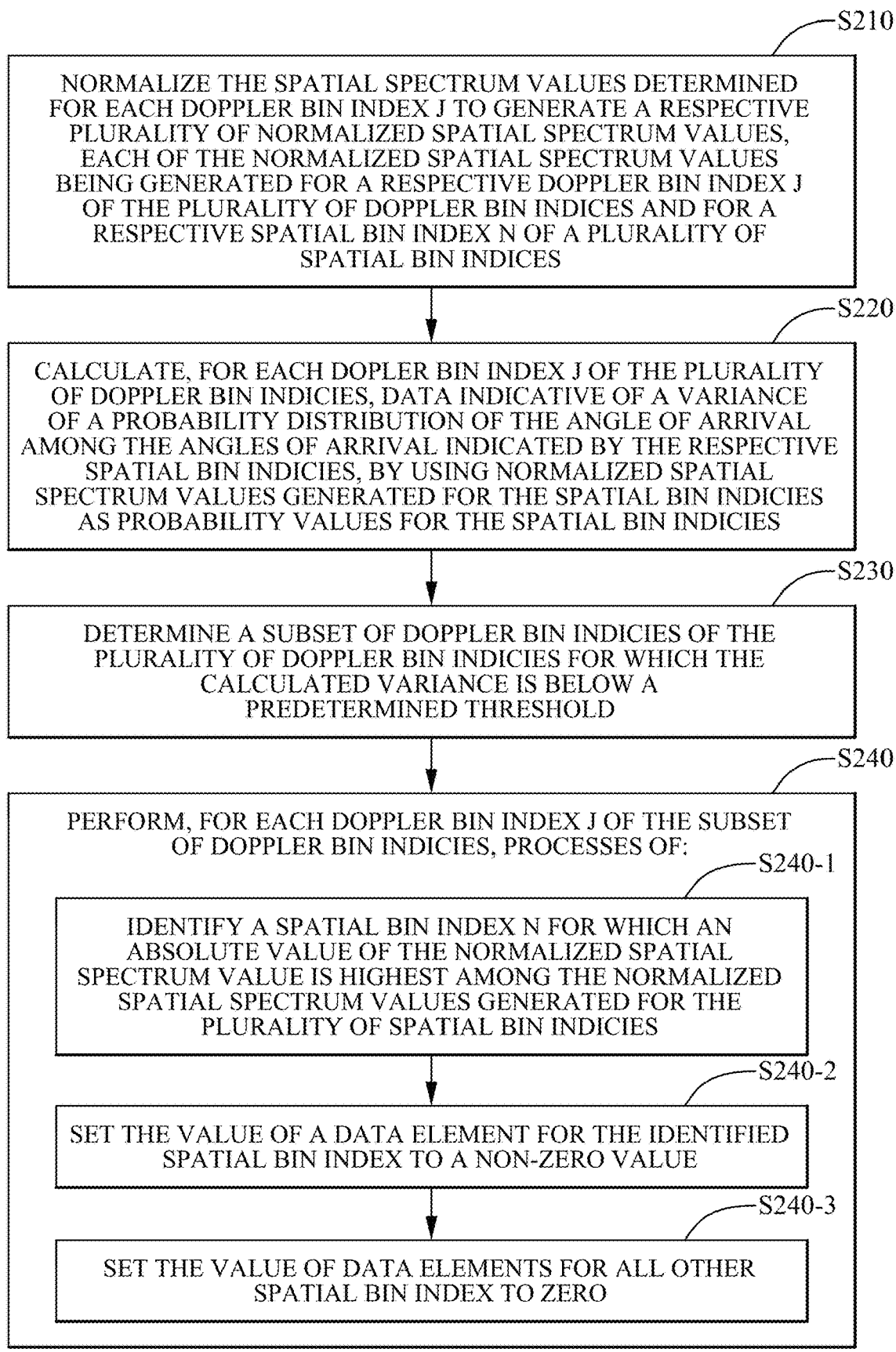
FIG. 5 is a flow diagram illustrating further processes performed by the radar data processing apparatus of the first example embodiment to obtain motion spectrum data.

FIG. 5 is a flow diagram illustrating a process which can be further performed by the motion spectrum acquisition module 6 to obtain the set of motion spectrum data S from the spatial spectrum values that have been calculated for each Doppler bin index. After calculating spatial spectrum values for each Doppler bin index in step S30-1 of FIG. 3, the motion spectrum acquisition module 6 may further perform, in step S210 of FIG. 5, a normalization of the spatial spectrum values that are determined for the Doppler bin index to generate a respective plurality of normalized spatial spectrum values, each of the normalized spatial spectrum values being generated for a respective Doppler bin index of the plurality of Doppler bin indices and for a respective spatial bin index of a plurality of spatial bin indices. For example, the motion spectrum acquisition module 6 may perform L1 normalization on the plurality of spatial spectrum values generated for each Doppler bin index so that the sum of all of the normalized spatial spectrum values generated for the Doppler bin index equals a value of one. The normalized spatial spectrum values computed from the plurality of spatial spectrum values may be denoted $q_{jn}$, j=1, . . . ,J, n=1, . . . , N.

Figure 6:
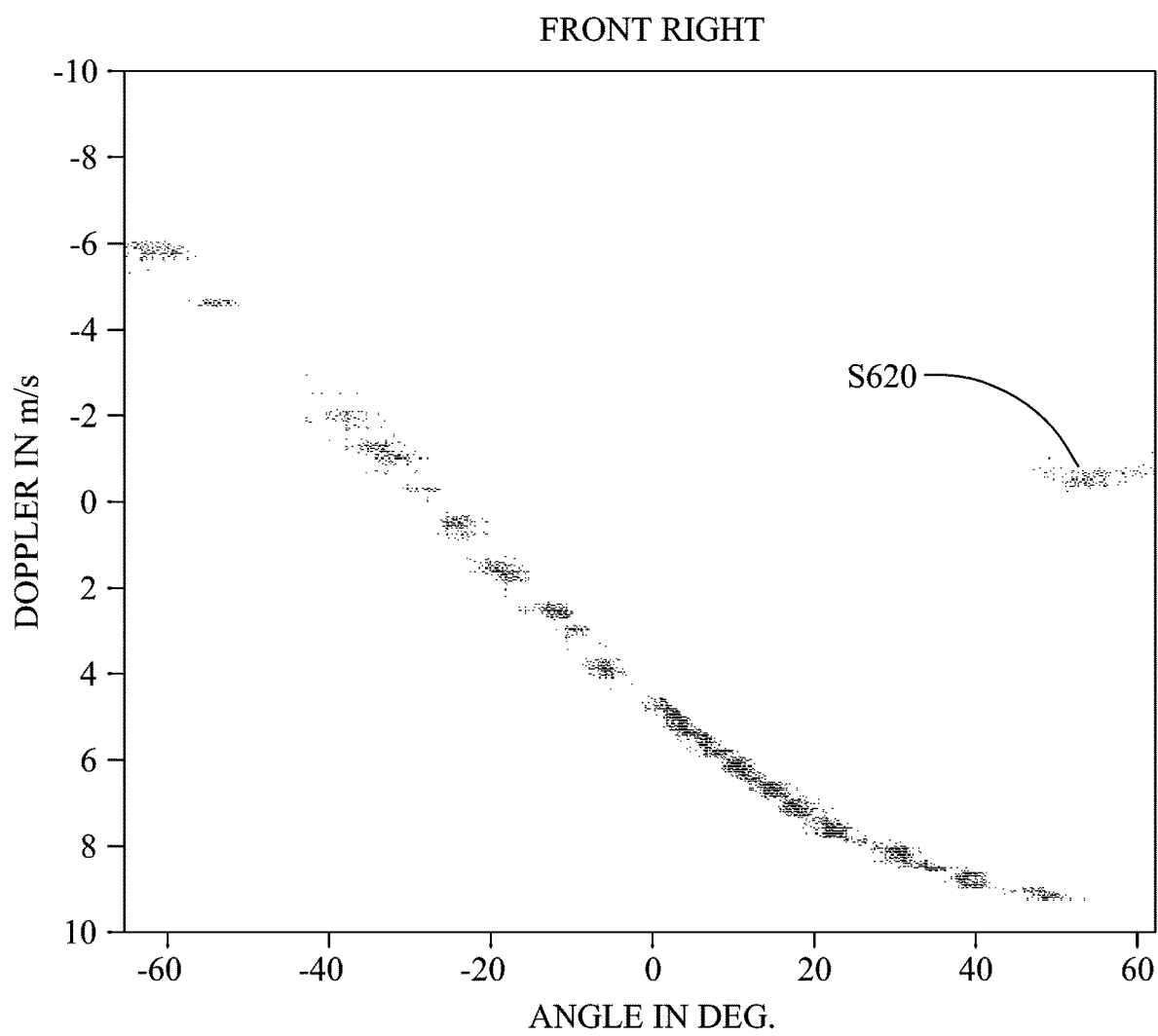
FIG. 6 illustrates an example plot of normalized spatial spectrum values in the Doppler-against-angle domain that are generated by the radar data processing apparatus of the first example embodiment.

FIG. 6 illustrates an example plot of normalized spatial spectrum values that are generated in step S210 of FIG. 5. In FIG. 6, the Doppler bin indices, upon conversion into radial velocity values, cover a range of −10 m/s to 10 m/s, and spatial spectrum values are calculated (using the MUSIC algorithm in the present example embodiment) for an (azimuth) angle range of −75° to 75° formed with respect to the axis of the radar sensor 20. Normalized spatial spectrum values of higher magnitudes are displayed using higher intensity pixel values.

As shown in FIG. 6, due to the presence of one or more stationary targets 40 within the field-of-view of the radar sensor 20, the variation of radial velocity with angle that is mapped out by the peak normalized spatial spectrum value (or high-valued normalized spatial spectrum values) for each Doppler bin index, approximately follows a sinusoidal trajectory, which is consistent with relationship specified by the equation of motion in (1), (2) and (3). Accordingly, the ego-motion parameters $v_x$, $v_y$, and ω in equations (1), (2) and (3) may be estimated using the normalized spatial spectrum values, by performing regression analysis, for example, by fitting the function given by equations (1), (2) and (3) to the variation of radial velocity with angle that is specified by the peak (or high-valued) normalized spatial spectrum value of each Doppler bin index.

In FIG. 6, the presence of moving targets can cause isolated peak values that lie outside the sinusoidal trajectory, such as, for example, the high intensity value at location 620 in FIG. 6. The presence of strong normalized spatial spectrum values caused by moving targets may lead to reduced accuracy in estimating the ego-motion parameters. In particular, assuming that the range of angles evaluated by the spectral estimation algorithm cover a range for which equation (1) only has one unique angle solution for each radial velocity, then for each Doppler bin in FIG. 6, only a single strong normalize spatial spectrum value should exist.

Accordingly, as shown in step S220 of FIG. 5, the motion spectrum acquisition module 6 may, as in the present example embodiment, further calculate, for each Doppler bin index of the plurality of Doppler bin indices, data indicative of a variance of a probability distribution of the angle of arrival of the radar return signal relative to the axis of the radar sensor 20 among the angles of arrival indicated by the respective spatial bin indices, by using normalized spatial spectrum values generated for the spatial bin indices as probability values for the spatial bin indices. For example, for a given Doppler bin index j, the plurality of spatial bin indices n=1, 2 . . . , N may be taken as the set of all possible values of a random angle variable $\Theta_j$. Furthermore, the normalized spatial spectrum value $q_{jn}$, calculated for each of the spatial bin indices n=1, 2 . . . , N for the Doppler bin index j, may be taken as a probability of occurrence of the spatial bin index. Accordingly, the variance of the probability distribution of angle variable $\Theta_j$ among the angles $\theta_n$, n=1, 2 . . . , N respectively represented by spatial bin indices n=1, 2 . . . , N for the Doppler bin j may be calculated using the following formula, $$\mathrm{Var}(\Theta_j)=\Sigma_{n=1}^{N} q_{jn}(\theta_n - E[\Theta_j])^2 \qquad (5)$$

wherein $E[\Theta_j]=\Sigma_{n=1}^{N}q_n\theta_n$ is the expected value for the random angle variable $\Theta_j$. However, in some embodiments, instead of using the expected value for angle variable $\Theta_j$ to compute the variance in equation (5), the mode of angle variable $\Theta_j$ (corresponding to the peak normalized spatial spectrum value for Doppler bin index j) may instead be used.

In step S230 of FIG. 5, the motion spectrum acquisition module 6 determines a subset of Doppler bin indices of the plurality of Doppler bin indices for which the variance calculated in step S220 is below a predetermined threshold. Furthermore, the value of each data element of the motion spectrum data S is based on a respective normalized spatial spectrum value that has been generated for a Doppler bin index in the subset of Doppler bin indices and a spatial bin index corresponding to the data element. In other words, after normalizing the spatial spectrum values in step S210 of FIG. 5, and calculating the variance for each Doppler bin index in step S220, only the Doppler bin indices that have a variance below the predetermined threshold are used to generate the motion spectrum data S.

The motion spectrum acquisition module 6 may, as shown in step S240 of FIG. 5, generate the values of data elements of the set of motion spectrum data S for each Doppler bin index in the subset of Doppler bin indices, by processing the plurality of normalized spatial spectrum values generated for the Doppler bin index by performing steps of S240-1, S240-2 and S240-3 also illustrated in FIG. 5. More specifically, in step S240-1, the motion spectrum acquisition module 6 identifies a spatial bin index having the highest absolute value of the normalized spatial spectrum value among the normalized spectrum values generated for the plurality of spatial bin indices. In step S240-2 of FIG. 5, the motion spectrum acquisition module 6 sets the value of a data element for the identified spatial bin index to a non-zero value. In addition, in step S240-3 of FIG. 5, the motion spectrum acquisition module 6 sets the value of data elements for all other spatial bin indices to zero.

Although FIG. 5 illustrates steps S210, S220, S230 and S240 being performed in a sequence, it should be understood that these are optional steps which may be further performed after step S30 of FIG. 3, to obtain the set of motion spectrum data S. That is, the set of motion spectrum data S may be the output of any one of steps S30, S210, S230 and S240 as previously described. In addition, in some example embodiments, step S240 may be performed directly on the normalized spatial spectrum values generated in step S210 in order to generate the set of motion spectrum data S, without performing steps S220 and S230.

After the set of motion spectrum data S has been acquired, the ego-motion determination module 8 is arranged to determine the ego-motion information of the vehicle 30 by solving a motion equation system comprising a plurality of equations of motion that are generated using the set of motion spectrum data. Each equation of motion relates a respective value indicative of a radial velocity of a stationary object relative to the radar sensor 20, a respective value indicative of an angular displacement of the stationary object with respect to the axis of the radar sensor 20, and a variable indicative of a velocity of the vehicle 30. The values indicative of radial velocity in the motion equation system may be precalculated based on the Doppler bin indices and independent of the radar data R. Furthermore, the values indicative of the angular position in the motion equation system are precalculated based on the spatial bin indices and independent of the radar data R.

In the present example embodiment, equation (1) may be used as the equation of motion to determine vehicle ego-motion information that includes $v_x$, $v_y$, and $\omega$ of the vehicle 30. In order to uniquely determine ego-motion information $v_x$, $v_y$, and $\omega$ using equation (1), motion spectrum data S generated from radar data acquired by at least two radar sensors mounted at different positions around the vehicle 30 is required. Each radar sensor may take the form of radar sensor 20 previously described, and the motion spectrum generator module 8 may generate a respective set of motion spectrum data from radar data received at each radar sensor, using any of the previously described methods for generating a set of motion spectrum data.

More specifically, in a case wherein K number of radar sensors each having a plurality of antenna elements are mounted at K different positions on the vehicle 30, wherein K is an integer greater than or equal to 2, and wherein a respective set of motion spectrum data is generated for each of each of the K number of radar sensors (using a method of generating a set of motion spectrum data as described in any of the previously described embodiments/examples), the ego-motion determination module 8 may, as in the present example embodiment, be arranged to determine the ego-motion information by estimating the values of $v_x$, $v_y$ and $\omega$ in equation (1) by solving the motion equation system:

$$D = H \cdot E \tag{6}$$

$$\text{wherein } D = \begin{bmatrix} d_1 \\ d_2 \\ \vdots \\ d_K \end{bmatrix}, H = \begin{bmatrix} M_1 T_1 L_1 \\ M_2 T_2 L_2 \\ \vdots \\ M_K T_K L_K \end{bmatrix}, E = \begin{bmatrix} \omega \\ v_x \\ v_y \end{bmatrix}.$$

$d_k = [d_{k,1}, d_{k,2}, \ldots, d_{k,F}]^T$, $k=1, 2, \ldots, K$, wherein F is an integer equal to or greater than 1. Values $d_{k,1}, d_{k,2}, \ldots, d_{k,F}$ are indicative of F radial velocity values that correspond to F respective Doppler bin indices of the k-th set of motion spectrum data S generated for the k-th radar sensor 20.

Matrix $M_k$, $k=1, 2, \ldots, K$ is a F×U dimensional matrix containing data elements of the k-th set of motion spectrum data S, wherein U is an integer greater than or equal to one, and the values of F and U are respectively selected for each of $k=1, 2, \ldots, K$. Each row index of $M_k$ corresponds to a respective Doppler bin index of the k-th set of motion spectrum data S, and each column index of $M_k$ corresponds to a respective spatial bin index of the k-th set of motion spectrum data S. Each row of $M_k$ includes data elements for the corresponding Doppler bin index of the k-th set of motion spectrum data S.

Matrix $T_k$ is defined as:

$$T_k = \begin{bmatrix} \cos(\theta_{k,1} + \theta_k^M) & \sin(\theta_{k,1} + \theta_k^M) \\ \cos(\theta_{k,2} + \theta_k^M) & \sin(\theta_{k,2} + \theta_k^M) \\ \vdots & \vdots \\ \cos(\theta_{k,U} + \theta_k^M) & \sin(\theta_{k,U} + \theta_k^M) \end{bmatrix}, k = 1, 2, \ldots, K,$$

wherein $\theta_{k,1}, \theta_{k,2}, \ldots, \theta_{k,U}$, $u=1, 2, \ldots, U$ are indicative of U angle values that respectively correspond to U spatial bin indices of the k-th set of motion spectrum data. $\theta_k^M$ is indicative of the mounting angle for the k-th radar sensor that is an angle between an axis of the k-th radar sensor and an axis of the vehicle coordinate system of the vehicle 20.

Matrix $L_k$ is defined as:

$$L_k = \begin{bmatrix} -l_k^y & 1 & 0 \\ l_k^x & 0 & 1 \end{bmatrix}, k = 1, 2, \ldots, K$$

and is a model matrix for the k-th radar sensor, wherein $l_k^x$ is indicative of a mounting position of the k-th radar sensor along the X-axis of the vehicle coordinate system, and $l_k^y$ is indicative of a mounting position of the k-th radar sensor along the Y-axis of the vehicle coordinate system. Solution of (6) requires H to have at least three linearly independent rows.

It should be further noted that equation system (6) may be rewritten in numerous equivalent forms by transforming one or more variables of the equation system into functions of other variables. As one example, when the set of motion spectrum data S includes spatial spectrum values that are obtained over different spatial frequency bin indices, then angle values $\theta_{k,1}, \ldots, \theta_{k,U}$ in equation system (6) may alternatively be converted into corresponding spatial frequency values, in order to estimate the ego-motion parameters in equation system (6). The relationship which may be used to transform angle values $\theta_{k,1}, \ldots, \theta_{k,U}$ in equation system (4) into corresponding spatial frequency values $\psi_{k,1}, \ldots, \omega_{k,U}$ may be given by $\psi = b \sin(\theta)$. Matrix $T_k$ of equation (4) can thus be equivalently rewritten as:

$$T_k = \begin{bmatrix} \sqrt{1 - \frac{\psi_{k,1}^2}{b^2}} & \frac{\psi_{k,1}}{b} \\ \vdots & \vdots \\ \sqrt{1 - \frac{\psi_{k,U}^2}{b^2}} & \frac{\psi_{k,U}}{b} \end{bmatrix} \cdot \begin{bmatrix} \cos(\theta_k^M) & \sin(\theta_k^M) \\ -\sin(\theta_k^M) & \cos(\theta_k^M) \end{bmatrix}, k = 1, 2, \ldots, K.$$

The term b is a constant, and may, as in the present example, be given by $$b = \frac{c_k}{\lambda},$$

where $c_k$ is the distance between the antenna array elements of the k-th radar sensor and $\lambda$ is the wavelength of the received signal at the k-th radar sensor.

Solving the equation system in (6) allows the estimation of the full set of ego-motion parameters $v_x$, $v_y$, and $\omega$ in (1). However, in alternative embodiments, equation (1) can be simplified by assuming certain conditions. For example, in an alternative embodiment, the yaw-rate $\omega$ of the vehicle 30 can be assumed to be zero, and equation (2) previously defined can be used to estimate ego-motion information that includes $v_x$ and $v_y$. In particular, in equation (2), the terms $v_x^s$ and $v_y^s$, which are the X and Y components of the velocity of the radar sensor respectively (rather than the velocity of the vehicle 30) can be calculated using (2). Furthermore, under the condition that the yaw-rate is zero, the vehicle velocities $v_x$, $v_y$ can be determined by setting $v_x = v_x^s$ and $v_y = v_y^s$. It should be further noted that when the yaw-rate is zero, the vehicle velocities $v_x$ and $v_y$ can be determined using just one set of motion of spectrum data S, rather than requiring at least two sets of motion spectrum data from two radar sensors mounted at two different positions on the vehicle 30.

More specifically, in a case where K number of radar sensors each having a plurality of antenna elements are mounted at K different positions on the vehicle 30, wherein K is an integer greater than or equal to 1, and wherein a respective set of motion spectrum data is generated for each of each of the K number of radar sensors (using method of generating a set of motion spectrum data as described any of the previously described embodiments/examples), the ego-motion determination module 8 may be arranged to determine the ego-motion information by estimating the values of $v_x^s$ and $v_y^s$ in equation (2), and setting the ego-motion parameters as $v_x = v_x^s$ and $v_y = v_y^s$. In particular, estimating the values of $v_x^s$ and $v_y^s$ includes solving the motion equation system:

$$D = H \cdot E \qquad (7)$$

$$\text{wherein } D = \begin{bmatrix} d_1 \\ d_2 \\ \vdots \\ d_K \end{bmatrix}, H = \begin{bmatrix} M_1 T_1 \\ M_2 T_2 \\ \vdots \\ M_K T_K \end{bmatrix}, E = \begin{bmatrix} v_x^s \\ v_y^s \end{bmatrix}$$

$d_k = [d_{k,1}, d_{k,2} \ldots, d_{k,F}]^T$, $k=1, 2, \ldots, K$ wherein F is an integer equal to or greater than 1, and $d_{k,1}, d_{k,2} \ldots, d_{k,F}$ are indicative of F radial velocity values that correspond to F respective Doppler bin indices of the k-th set of motion spectrum data S acquired for the k-th radar sensor 20.

Matrix $M_k$, $k=1, 2, \ldots, K$ is a F×U dimensional matrix containing data elements of the k-th set of motion spectrum data S, wherein U is an integer greater than or equal to one, and the values of F and U are respectively selected for each of $k=1, 2, \ldots, K$. Each row index of $M_k$ corresponds to a respective Doppler bin index of the k-th set of motion spectrum data S, and each column index of $M_k$ corresponds to a respective spatial bin index of the k-th set of motion spectrum data S. Each row of $M_k$ includes data elements for the corresponding Doppler bin index of the k-th set of motion spectrum data S.

$T_k$ is defined as:

$$T_k = \begin{bmatrix} \cos(\theta_{k,1} + \theta_k^M) & \sin(\theta_{k,1} + \theta_k^M) \\ \cos(\theta_{k,2} + \theta_k^M) & \sin(\theta_{k,2} + \theta_k^M) \\ \vdots & \vdots \\ \cos(\theta_{k,U} + \theta_k^M) & \sin(\theta_{k,U} + \theta_k^M) \end{bmatrix}, k = 1, 2, \ldots, K,$$

wherein $\theta_{k,1}, \theta_{k,2} \ldots, \theta_{k,U}$, $u=1, 2, \ldots, U$ are indicative of U angle values that respectively correspond to U spatial bin indices of the k-th set of motion spectrum data S. $\theta_k^M$ is indicative of the mounting angle for the k-th radar sensor that is an angle between an axis of the k-th radar sensor and an axis of the vehicle coordinate system of the vehicle 30.

In some embodiments, it could be assumed that a Y-axis component of $v_y$ of the vehicle velocity is zero, in which case, equation (3) previously defined may be used to obtain ego-motion information that includes values $\omega$ and $v_x$.

More specifically, in a case where K number of radar sensors each having a plurality of antenna elements are mounted at K different positions on the vehicle 30, wherein K is an integer greater than or equal to 1, and wherein a respective set of motion spectrum data S is generated for each of each of the K number of radar sensors (using a method of generating a set of motion spectrum data S as described in any of the previously described embodiments/examples), the ego-motion determination module 8 may be arranged to determine the ego-motion information by estimating the values ω and $v_x$ by solving the motion equation system:

$$D = H \cdot E \quad (8)$$

wherein $D = \begin{bmatrix} d_1 \\ d_2 \\ \vdots \\ d_K \end{bmatrix}$, $H = \begin{bmatrix} M_1 T_1 L_1 \\ M_2 T_2 L_2 \\ \vdots \\ M_K T_K L_K \end{bmatrix}$, $E = \begin{bmatrix} \omega \\ v_x \end{bmatrix}$ $d_k=[d_{k,1}, d_{k,2}, \ldots, d_{k,F}]^T$, $k=1, 2, \ldots, K$ wherein F is an integer equal to or greater than 1, and $d_{k,1}, d_{k,2} \ldots, d_{k,F}$ are indicative of F radial velocity values that correspond to F respective Doppler bin indices of the k-th set of motion spectrum data S generated for the k-th radar sensor 20.

Matrix $M_k$, $k=1, 2, \ldots, K$ is a F×U dimensional matrix containing data elements of the k-th set of motion spectrum data S, wherein U is an integer greater than or equal to one, and the values of F and U are respectively selected for each of $k=1, 2, \ldots, K$. Each row index of $M_k$ corresponds to a respective Doppler bin index of the k-th set of motion spectrum data, and each column index of $M_k$ corresponds to a respective spatial bin index of the k-th set of motion spectrum data. Each row of $M_k$ includes data elements for the corresponding Doppler bin index of the k-th set of motion spectrum data.

Matrix $T_k$ is defined as:

$$T_k = \begin{bmatrix} \cos(\theta_{k,1} + \theta_k^M) & \sin(\theta_{k,1} + \theta_k^M) \\ \cos(\theta_{k,2} + \theta_k^M) & \sin(\theta_{k,2} + \theta_k^M) \\ \vdots & \vdots \\ \cos(\theta_{k,U} + \theta_k^M) & \sin(\theta_{k,U} + \theta_k^M) \end{bmatrix}, k = 1, 2, \ldots, K,$$

wherein $\theta_{k,1}, \theta_{k,2} \ldots, \theta_{k,U}$, $u=1, 2, \ldots, U$ are indicative of U angle values that respectively correspond to U respective spatial bin indices of the k-th set of motion spectrum data, wherein $\theta_k^M$ is indicative of the mounting angle for the k-th radar sensor that is an angle between an axis of the k-th radar sensor and an axis of the vehicle coordinate system of the vehicle 30.

$$L_k = \begin{bmatrix} -l_k^y & 1 \\ l_k^x & 0 \end{bmatrix}, k = 1, 2, \ldots,$$

K is a model matrix for the k-th radar sensor, wherein $l_k^x$ is indicative of a mounting position of the k-th radar sensor along an X-axis of the vehicle coordinate system, and $l_k^y$ is indicative of a mounting position of the k-th radar sensor along a Y-axis of the vehicle coordinate.

In addition, it should be understood that the estimation of the ego-motion parameters can be equivalently performed taking the transpose of both sides of the equation system (6), (7) and (8).

In the present example embodiment, to generate the respective set of motion spectrum data for each of the K radar sensors, each of steps S210, S220, S230 and S240 of FIG. 5 is performed on the spatial spectrum values generated at step S30 of FIG. 3 for the radar sensor. Accordingly, the respective set of motion spectrum data generated for each of the K radar sensors at step S240 includes a non-zero value (e.g., 1) at a single spatial bin index for each Doppler bin index, with the data elements for the remaining spatial bin indices for each Doppler bin index set to a value of zero (as described with reference to step S240-3 of FIG. 5). The non-zero value may, as in the present example be a value of one but may alternatively be any non-zero value.

The values $d_{k,1}, d_{k,2}, \ldots, d_{k,F}$ may, as in the present example embodiment, be precalculated based on the F respective Doppler bin indices of the k-th set of motion spectrum data and independent of the radar data received at the k-th radar sensor. Furthermore, the values $\theta_{k,1}, \theta_{k,2} \ldots, \theta_{k,U}$, may be precalculated based on the U respective spatial bin indices of the k-th set of motion spectrum data, and independent of the radar data received at the k-th radar sensor. In particular, in the present example embodiment, the values $d_{k,1}, d_{k,2} \ldots, d_{k,F}$ may be derived from the corresponding Doppler bin indices by using a predetermined conversion factor that is based on a Doppler resolution of the k-th radar sensor 20. Similarly, the angle values $\theta_{k,1}, \theta_{k,2} \ldots, d_{k,U}$, may, as in the present example embodiment, be derived from the corresponding spatial bin indices by using a predetermined conversion factor that is based on an angle resolution of the k-th radar sensor 20. The radial velocity values of $d_{k,1}, d_{k,2} \ldots, d_{k,F}$, angle values $\theta_{k,1}, \theta_{k,2} \ldots, d_{k,U}$ and the values of trigonometric terms in equation system (6), (7) or (8) may, as in the present example embodiment, be pre-calculated and stored in memory, before radar data for each of the K radar sensors is acquired and processed by the radar data processing apparatus 10. In other words, the values of $d_{k,1}, d_{k,2} \ldots, d_{k,F}, \theta_{k,1}, \theta_{k,2} \ldots, d_{k,U}$ and the values of trigonometric terms in equation systems (6), (7) or (8) only need to be calculated once, since due to bin discretization, their values are known beforehand.

To estimate the ego-motion parameters, a linear least squares estimation method may be used to solve the motion equation system in equation (6), (7) or (8) to determine the ego-motion information.

For example, in the present embodiment, to estimate the values of ego-motion parameters $v_x$, $v_y$ and ω in equation system (6), the ego-motion determination module 8 may be arranged to use a linear least square estimation algorithm. For example, an initial estimate of the ego-motion parameters $\hat{c}=[\hat{\omega}, \hat{v}_x, \hat{v}_y]^T$ may be calculated using the formula for ordinary least squares estimation $\hat{c}=(H^TH)^{-1}H^TD$.

However, the linear least squares estimation is not limited to the above formula, and other formulations of linear least squares estimation may be used.

In some example embodiments, in order to improve the robustness of the linear least squares estimation, the ego-motion determination module 8 may perform the linear least squares estimation by performing an iterative algorithm that classifies the Doppler bin indices of the K sets of motion spectrum data S as inliers and outliers, and performing estimation based only on the data elements of the inliers' Doppler bin indices. The iterative algorithm may be based on an application of a Random Sample Consensus (RANSAC) method or an M-estimator Sample Consensus (MSAC) method, for example, to the data elements for Doppler bin indices of the K sets of motion spectrum data S in order to select a subset of Doppler bin indices that yields the best estimate of the ego-motion parameters. However, other robust estimation methods such as the M-estimator (e.g., Huber K-estimator) can also be used.

Figure 7:
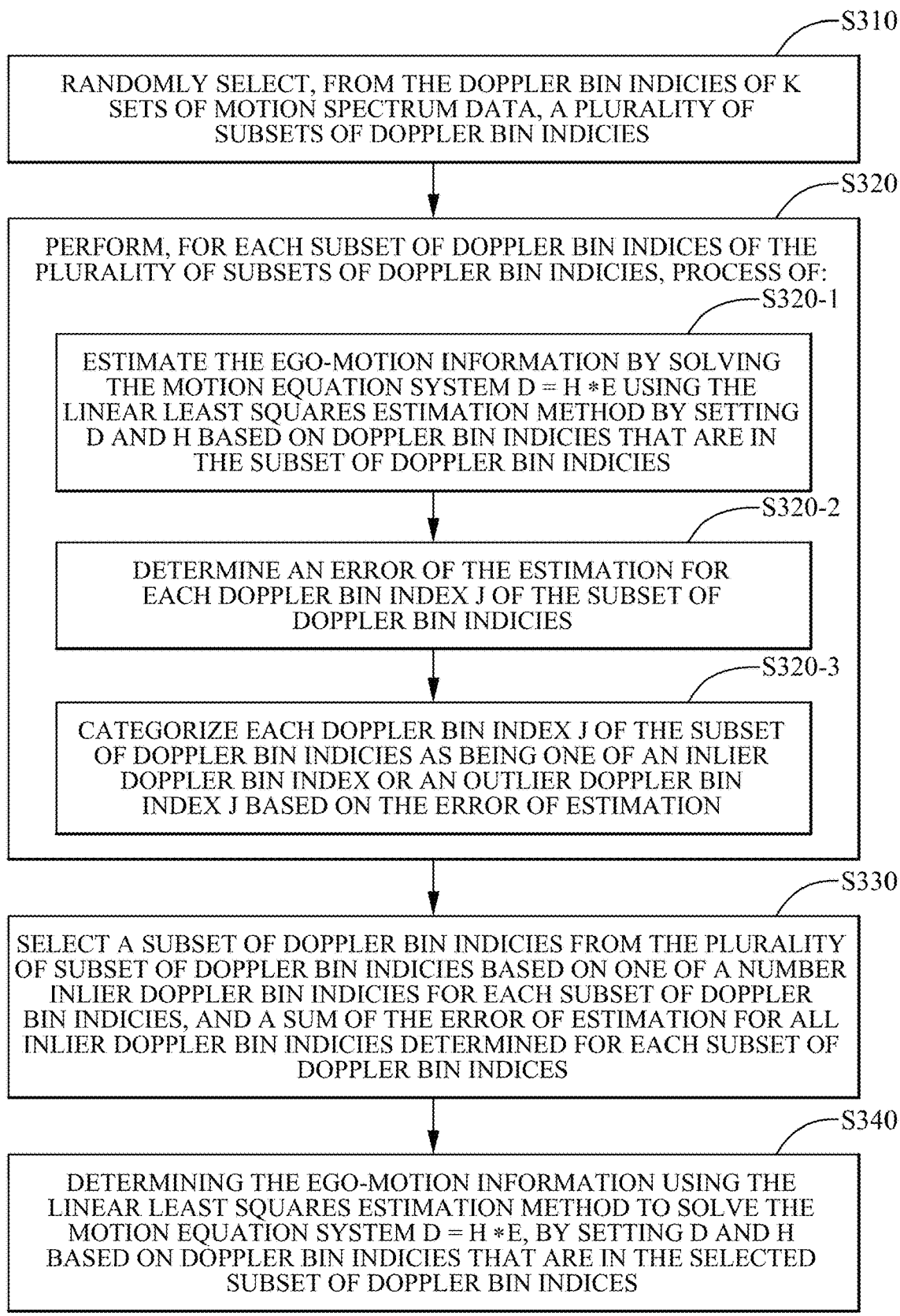
FIG. 7 is a flow diagram illustrating a process performed by the motion spectrum acquisition module 6 of the example embodiment to estimate ego-motion parameters using the linear least squares estimation method.

FIG. 7 illustrates an iterative method that may be performed by the ego-motion determination module 8 to estimate the ego-motion parameters $v_x$, $v_y$ and $\omega$ using the linear least squares estimation method.

In step S310 of FIG. 7, the ego-motion determination module 8 randomly selects from the Doppler bin indices of the K sets of motion spectrum data S, a plurality of subsets of Doppler bin indices.

In step S320 of FIG. 7, the ego-motion determination module 8 performs, for each subset of Doppler bin indices of the plurality of subsets of Doppler bin indices, processes of steps S320-1, S320-2, and S320-3.

In particular, in step S320-1, the ego-motion determination module 8 estimates the ego-motion information by solving the motion equation system D=H·E as set out in (6), using the linear least squares estimation method, by setting D and H based on doppler bin indices that are in the subset of doppler bin indices. More specifically, the ego-motion determination module 8 determines the ego-motion information using the linear least squares estimation method to solve the motion equation system D=H·E as set out in (6) by setting $d_{k,1}, d_{k,2} \ldots, d_{k,F}$ for k=1, 2, ..., K to radial velocity values that correspond to respective Doppler bin indices of the k-th set of motion spectrum data that are in the subset of Doppler bin indices, and further setting each row of $M_k$ (included in matrix H) in equation system (6) to data elements of a respective Doppler bin index of the k-th set of motion spectrum data that is in the subset of Doppler bin indices.

In step S320-2 of FIG. 7, the ego-motion determination module 8 determines an error of the estimation for each Doppler bin index of the subset of Doppler bin indices. In step S320-3 of FIG. 7, the ego-motion determination module 8 categorizes each Doppler bin index of the subset of Doppler bin indices as being either an inlier Doppler bin index or an outlier Doppler bin index, based on the determined error of estimation for the Doppler bin index.

In the present example where equation system (6) is used to determine the ego-motion information, for step S320-2, the ego-motion determination module 8 may determine the error of the estimation for each of Doppler bin index of the subset of Doppler bin indices, based on a difference between the radial velocity value corresponding to the Doppler bin index and a respective fitted value of a regression model that is determined based on the estimated values of $v_x$, $v_y$, and $\omega$. That is, the estimated values of $v_x$, $v_y$, and $\omega$ may be substituted back to the motion equation system (6) to determine a fitted radial velocity value for each Doppler bin index of the subset of Doppler bin indices. The error of estimation (i.e., error residual) for each Doppler bin index of the subset of Doppler bin indices may thus be given by the square root of the difference between the radial velocity value corresponding to the Doppler bin index and the fitted radial velocity value corresponding to the Doppler bin index. However, the error of estimation for each Doppler bin index may be computed using a different metric.

In the present example, for step S320-3, each Doppler bin index of the subset of Doppler bin indices may be categorized as an inlier Doppler bin index or an outlier Doppler bin index, based on a threshold value. Doppler bin indices for which the error of estimation is below the threshold value may be determined as an inlier Doppler bin index. Furthermore, Doppler bin indices with an error of estimation above the threshold value may be determined as an outlier Doppler bin index.

In step S330 of FIG. 7, the ego-motion determination module 8 selects a subset of Doppler bin indices from the plurality of subset of Doppler bin indices based on (i) a total number of inlier Doppler bin indices for each subset of Doppler bin indices, or (ii) a sum of the error of the estimation for all inlier Doppler bin indices determined for each subset of Doppler bin indices. For example, in the case that a RANSAC algorithm is used, the ego-motion determination module 8 may select, in step S330 of FIG. 7, the subset of Doppler bin indices that has the most inlier Doppler bin indices based on the determination of step S320-3.

In some example embodiments, when a MSAC algorithm is used, the ego-motion determination module 8 may alternatively select, in step S330 of FIG. 7, the subset of Doppler bin indices that has the lowest value in terms of the sum of the error of estimation calculated for all inlier Doppler bin indices in the subset. In other words, as part of step S330 for this embodiment, the ego-motion determination module 8 may calculate, for each subset of Doppler bin indices, the sum of the error of estimation for all inlier Doppler bin indices of the subset of Doppler bin indices. The subset of Doppler bin indices that produces the lowest value in the sum of error of estimation, may be selected as the subset in step S330. In some embodiments where the MSAC algorithm is used, the ego-motion determination module 8 may be configured to select the subset of Doppler bin indices from the plurality of subset of Doppler bin indices by further considering the outlier doppler bin indices in each subset. In particular, the outlier doppler bin indices may each be assigned a constant error value. The cumulative error that is the sum of the error of the estimation for all inlier Doppler bin indices, and the total constant error value for all outlier doppler bin indices (which is calculated by multiplying the constant error value by the number of outlier doppler bin indices) may then be determined for each subset of doppler bin indices. The subset of doppler bin indices having the lowest cumulative error may be selected as the subset in step S330.

In step S340 of FIG. 7, the ego-motion determination module 8 determines the ego-motion information using the linear least squares estimation method to solve the motion equation system D=H·E as set out in (6) by setting D and H based on doppler bin indices that are in the selected subset of doppler bin indices. In particular the ego-motion determination module 8 determines the ego-motion information using the linear least squares estimation method to solve the motion equation system D=H·E as set out in (6) by setting $d_{k,1}, d_{k,2} \ldots, d_{k,F}$ for k=1, 2, ..., K to radial velocity values that correspond to respective doppler bin indices of the k-th set of motion spectrum data that are categorized as an inlier doppler bin index in the selected subset of doppler bin indices, and by further setting each row of $M_k$, for k=1, 2, ..., K to data elements of a respective doppler bin index of the k-th set of motion spectrum data that is categorized as an inlier doppler bin index in the selected subset of doppler bin indices.

It should be understood that although steps S320-1 and S340 of FIG. 7 in the present example are described as being performed to solve the equation system set out in (6), these two steps may also be performed to solve the equation system set out in (7) or (8), in cases where only some of the ego-motion parameters are required.

The linear optimization procedure described above assumes that the set of motion spectrum data S generated for each radar sensor provides exact measurements without errors. However, this may not hold true for noisy real-world radar measurements. In some example embodiments, the estimation of the ego-motion parameters using motion equation system (6) (or using equation system (7) or (8)) may be refined by further considering the uncertainty in the observations, which are the variances of angle and radial velocity in the estimation of the ego-motion information.

Accordingly, the ego-motion determination module 8 may, in some example embodiments, be arranged to determine the ego-motion information (which are $v_x$, $v_y$ and $\omega$ in the present example where equation system (6) is to be solved) by further using a least square adjustment method. The least square adjustment method performs at least one iteration of an iterative process wherein an increment to an estimate of the ego-motion information is calculated in each iteration of the iterative process to obtain an updated estimate that is based on the estimate and the increment and used to calculate an increment in a next iteration of the iterative process. Furthermore, the increment is calculated based a first set of values for each of the K sets of motion spectrum data and a second set of values for each of the K sets of motion spectrum data. Each value of the first set of values is indicative of a variance of the distribution of the angle of arrival among the angles of arrival indicated by the respective spatial bin indices for a Doppler bin index of the motion spectrum data S, wherein each value of the first set of values is calculated using the normalized spatial spectrum values corresponding to the plurality of spatial bin indices for the Doppler bin index as respective probability values for the plurality of spatial bin indices. Furthermore, each value of the second set of values is indicative of a variance of the distribution of the radial velocity among the radial velocities indicated by the respective Doppler bin indices for a spatial bin index of the motion spectrum data S, wherein each value of the second set of values is calculated using the normalized spatial spectrum values corresponding to the plurality of Doppler bins for the spatial bin index as respective probability values for the plurality of Doppler bin indices. The initial estimate of ego-motion information used in the iterative process may, as in the present embodiment, be obtained using the linear least square estimation method.

The least squares adjustment method may, as in the present example, be used with the Gauss Helmert model, which is described in greater detail in "Convex Optimization for Inequality Constrained Adjustment Problems," PhD thesis of L. R. Roese-Koerner, Institut für Geodäsie and Geoinformation der Rheinischen Fri edrich-Wilhelms-Universität Bonn (2015).

More specifically, in the Gauss-Helmert model, denoting F number of observations denoted by observation vector l, and denoting the variance-covariance matrix of the observations as $Q_U$, the constraints given by F number of non-linear relationships between observations l and model parameter vector x can be written as:

$$g(l,x)=0 \tag{9}$$

This non-linear function can be solved by linearizing function (9) around an initial value and then solving the function iteratively. In particular, function (9) can be linearized using a Taylor series expansion around a selected point $(l_0, x_0)$ to express the non-linear function in an approximate linear form. More specifically, writing $$\tilde{x}=x_0+\Delta x \tag{10}$$

$$\tilde{l}=l+e=l_0+\Delta l+e \tag{11}$$

where e denotes the residual vector associated with the observations, a linearization of (9) using a Taylor series expansion around a Taylor point $(l_0, x_0)$ produces $$g(\tilde{x}, \tilde{l}) = g(x_0 + \Delta x, l_0 + \Delta l + e) = g(x, l) \mid \underbrace{x = x_0}_{w_0}, l - l_0 + \tag{12}$$

$$\underbrace{\frac{\partial g(x, l)}{\partial l}\mid_{x=x_0, l=l_0}}_{B^T}(\Delta l + e) + \underbrace{\frac{\partial g(x, l)}{\partial x}\mid_{x=x_0, l=l_0}}_{A}\Delta x =$$

$$\underbrace{w_0 + B^T \Delta l}_{w} + B^T e + A\Delta x = 0 = w + B^T e + A\Delta x = 0$$

For the least square adjustment in the non-linear Gauss-Helmert model, the objective is to minimize the weighted least square objection function $e^T Q_U^{-1} e$ under the equality constraints given by (12). This minimization problem can be solved using the method of Lagrange multipliers to obtain normal equation system (13) below, which is solved to calculate an increment $\Delta x$ of the parameter vector x, and a vector k of F Lagrangian multipliers:

$$\begin{bmatrix} BQ_u B^T & A \\ A^T & 0 \end{bmatrix} \begin{bmatrix} z \\ \Delta x \end{bmatrix} = -\begin{bmatrix} w \\ 0 \end{bmatrix} \tag{13}$$

After solving $\Delta x$, the estimated value of $\tilde{x}$ for the iteration can be obtained using equation (10). Furthermore, the residual vector e for the iteration can be calculated as $$e=Q_U B^T z \tag{14}$$

After computing residual vector e using equation (14), an estimate $\tilde{l}$ can be further computed using equation (11). The estimated values $\tilde{x}$ and $\tilde{l}$ can then be used as the starting point $(l_0, x_0)$ for a next iteration of the estimation. More specifically, in the next iteration, equation system (13) is solved using new values of A, B and w that are obtained using new starting point $(l_0, x_0)$, and new estimates for $\tilde{x}$ and $\tilde{l}$ can be computed.

In the present example, for simplicity, the value of U in equation system (6) is taken to be F, such that matrix $M_k$, k=1, 2, . . . , K in equation system (6) is a F×F dimensional matrix. However, it should be understood that the value of U is not limited in this regard and may be chosen to be any suitable value. Each equation in equation system (6) may be written in the form given by (9), so that each equation in equation system (6) is re-expressed as a function of the form:

$$g(\theta, d, \omega, v_x, v_y) = (-l_y \cos(\theta+\theta_M) + l_x \sin(\theta+\theta_M))\omega + \cos(\theta+\theta_M)v_x + \sin(\theta+\theta_M)v_y - d = 0 \tag{15}$$

In equation system (6), F number functions of the form expressed in (15) can be derived for each value of k=1, 2, . . . , K, where F may be chosen to be the same for all values of k or may alternatively be independently selected for each value of k. For each value of k=1, 2, . . . , K, each of the F functions can be linearized using a Taylor series expansion about a respective initial point $(\theta_0^{k,f}, d_0^{k,f}, \omega_0, v_{x_0}, v_{y_0})$, f=1, 2, . . . , F. Furthermore, as previously explained, minimization of the weighted least square function using the method of Lagrange multipliers can then be performed to derive a normal equation system of the form shown in equation (13), which can be given as follows:

$$\begin{bmatrix} BQ_u B^T & A \\ A^T & 0 \end{bmatrix} \begin{bmatrix} z \\ \Delta\omega \\ \Delta v_x \\ \Delta v_y \end{bmatrix} = -\begin{bmatrix} w \\ 0 \end{bmatrix} \tag{16}$$

-continued $$\text{wherein } A = \begin{bmatrix} A^1 \\ A^2 \\ \vdots \\ A^K \end{bmatrix}, w = \begin{bmatrix} w^1 \\ w^2 \\ \vdots \\ w^K \end{bmatrix},$$

$$B = \begin{bmatrix} B^1 & 0 & 0 \\ 0 & \ddots & 0 \\ 0 & 0 & B^K \end{bmatrix}, Q_{ll} = \begin{bmatrix} Q_{ll}^1 & 0 & 0 \\ 0 & \ddots & 0 \\ 0 & 0 & Q_{ll}^K \end{bmatrix},$$

for $k = 1, 2, \ldots K$, wherein $w^k$, k=1, 2, . . . , K is a vector whose elements are determined by substituting the initial point $(\theta_0^{k,f}, d_0^{k,f}, \omega_0, v_{x_0}, v_{y_0})$, f=1, 2, . . . , F into each of the respective F functions for each of k=1, 2, . . . , K. $\theta_0^{k,f}$ and $d_0^{k,f}$ are the values of d and θ in each equation of equation system (6). The initial values $\omega_0$, $v_{x_0}$ and $v_{y_0}$ may be selected as the estimates provided by the previously described linear least square estimation method. However, the initial point is not limited in this regarded and the values of $\omega_0$, $v_{x_0}$ and $v_{y_0}$ may be selected using any appropriate method.

Matrix $A^k$, for each value of k=1, 2, . . . , K, is a Jacobian matrix formed by substituting initial points $\theta_0^{k,f}$, f=1, 2, . . . , F into the partial derivatives of the F functions (for the value of k) with respect to the ego-motion parameters $\omega$, $v_x$, $v_y$.

$$A^k = \begin{bmatrix} -l_k^y \cos(\theta_0^{k,1} + \theta_k^M) + l_k^x \sin(\theta_0^{k,1} + \theta_k^M) & \cos(\theta_0^{k,1} + \theta_k^M) & \sin(\theta_0^{k,1} + \theta_k^M) \\ -l_k^y \cos(\theta_0^{k,f} + \theta_k^M) + l_k^x \sin(\theta_0^{k,f} + \theta_k^M) & \cos(\theta_0^{k,f} + \theta_k^M) & \sin(\theta_0^{k,f} + \theta_k^M) \end{bmatrix}$$

Matrix $B^k$, for each value of k=1, 2, . . . , K, is a Jacobian matrix formed by substituting initial points $(\theta_0^{k,f}, d_0^{k,f}, \omega_0, v_{x_0}, v_{y_0})$, f=1, 2, . . . , F into the partial derivatives of the F functions (for the value of k) with respect to d and θ. Matrix $B^k$ can be expressed in the form:

$$B^k = \begin{bmatrix} \frac{\partial g^k}{\partial \theta^1} & 0 & 0 & \frac{\partial g^k}{\partial d^1} & 0 & 0 \\ 0 & \ddots & 0 & 0 & \ddots & 0 \\ 0 & 0 & \frac{\partial g^k}{\partial \theta^F} & 0 & 0 & \frac{\partial g^k}{\partial d^F} \end{bmatrix}$$

wherein for $f = 1, 2, \ldots, F$, $$\frac{\partial g^k}{\partial \theta^f} = (l_k^y \sin(\theta_0^{k,f} + \theta_k^M) + l_k^x \cos(\theta_0^{k,f} + \theta_k^M))\omega_0 -$$

$$\sin(\theta_0^{k,f} + \theta_k^M)v_{x_0} + \cos(\theta_0^{k,f} + \theta_k^M)v_{y_0}$$

$$\frac{\partial g^k}{\partial d^f} = -1$$

$Q_U^k$, for each value of k=1, 2, . . . , K, represents the uncertainty in the observations $\theta_0^{k,f}, d_0^{k,f}$ for f=1, 2, . . . , F and may be given by, $$Q_{ll}^k = \begin{bmatrix} Q_{\theta\theta}^k & Q_{\theta d}^k \\ Q_{d\theta}^k & Q_{dd}^k \end{bmatrix}$$

where $Q_{dd}^k, Q_{d\theta}^k, Q_{\theta d}^k, Q_{\theta\theta}^k$ are variance-covariance matrices of the observations $\theta_0^{k,f}, d_0^{k,f}$ for f=1, 2, . . . , F, that can be calculated based on the k-th set of motion spectrum data that is derived from radar data measured by the k-th radar sensor. More specifically, $Q_{dd}^k$ is a covariance matrix of radial velocity measurements $d_0^{k,f}$ for f=1, 2, . . . , F that includes the variance (or uncertainty) for each radial velocity measurement as well as correlation between different radial velocity measurements. Each radial velocity measurement $d_0^{k,f}$ corresponds to a Doppler bin index of the k-th set motion spectrum data, and the variance for each radial velocity measurement may be calculated based on the normalized spatial spectrum values generated at step S210 of FIG. 5. In particular, equation (5) previously described may be used to determine a variance value for each Doppler bin (of the k-th set of motion spectrum data) that corresponds to a radial velocity measurement. The variance values determined for each radial velocity measurement may form the diagonal elements of $Q_{dd}^k$.

$Q_{\theta\theta}^k$ is a covariance matrix for angle measurements $\theta_0^{k,f}$, f=1, 2, . . . , F, that can be calculated based on the k-th set of motion spectrum data derived from radar data measured by the k-th radar sensor. More specifically, $Q_{\theta\theta}^k$ includes the variance for each angle measurement as well as correlation between angle measurements. Equation (5) may be similarly adapted to determine a variance for each spatial bin of the k-th set of motion spectrum data that corresponds to an angle measurement. In particular, the diagonal elements of $Q_{\theta\theta}^k$ may be calculated by determining a variance of the distribution of radial velocity among radial velocities indicated by the respective Doppler bin indices for each spatial bin index of the k-th set of motion spectrum data. The variance is calculated by using the normalized spatial spectrum values corresponding to the plurality of Doppler bin indices for the spatial bin as respective probability values for the plurality of Doppler bin indices. $Q_{d\theta}^k$, and $Q_{\theta d}^k$ characterize the covariance between radial velocity measurements and angle measurements for the k-th set of motion spectrum data.

Upon solving the values of z, Δω, $\Delta v_x$, $\Delta v_y$ in equation (16), the estimates $\tilde{\omega}$, $\tilde{v}_x$ and $\tilde{v}_y$ for the current iteration can be obtained by adding the parameter increments Δω, $\Delta v_x$, $\Delta v_y$ to the starting points $\omega_0$, $v_{x_0}$, $v_{y_0}$ respectively. Furthermore, the residual vector e can be calculated using equation (14). The estimates for the observations $\tilde{\theta}$ and $\tilde{d}$ (for use in the next iteration of estimation) can be further computed using the obtained residual vector e and equation (11).

Although the aforementioned example of the least square adjustment method is based on equation system (6), it should be apparent that the same method can be applied to equation system (7) or (8) previously defined, in the case where only some of the ego-motion parameter need to be calculated.

Although the present example performs estimation of the ego-motion parameters using the least squares adjustment method that uses the Gauss-Helmert model, in alternative embodiments, the total least square (TLS) method may alternatively be used.

Figure 8:
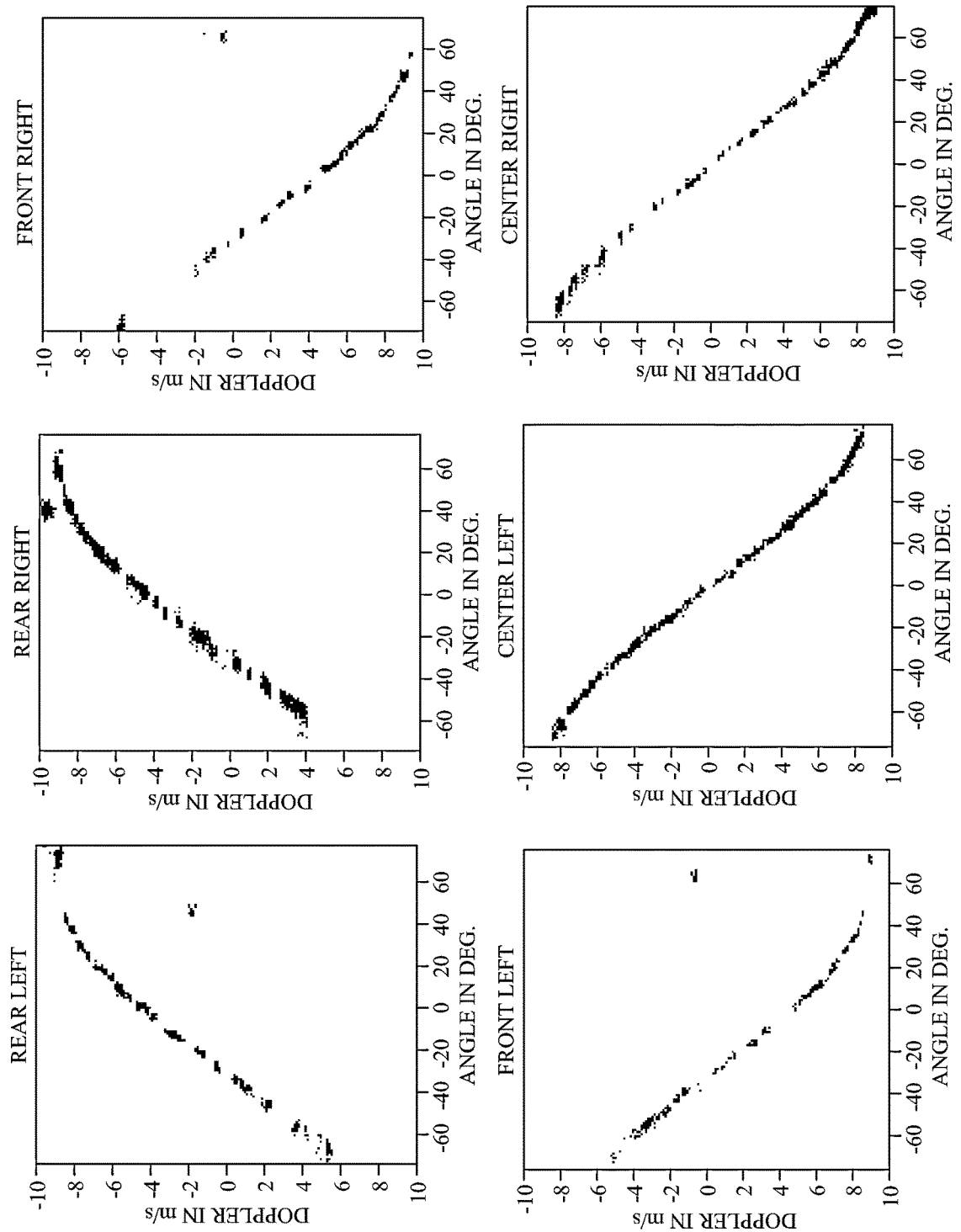
FIG. 8 illustrates six different plots of a set of motion spectrum data corresponding to radar data acquired by six different radar sensors mounted on a host vehicle.

FIG. 8 illustrates six different plots of motion spectrum data S corresponding to radar data acquired by six different radar sensors mounted on a host vehicle, each radar sensor being mounted at a different location on the vehicle and scanning a different field-of-view around the vehicle. In each plot, the variation of radial velocity with azimuth angle as given by the high intensity values in plot is consistent with the motion equation (1).

Figure 9:
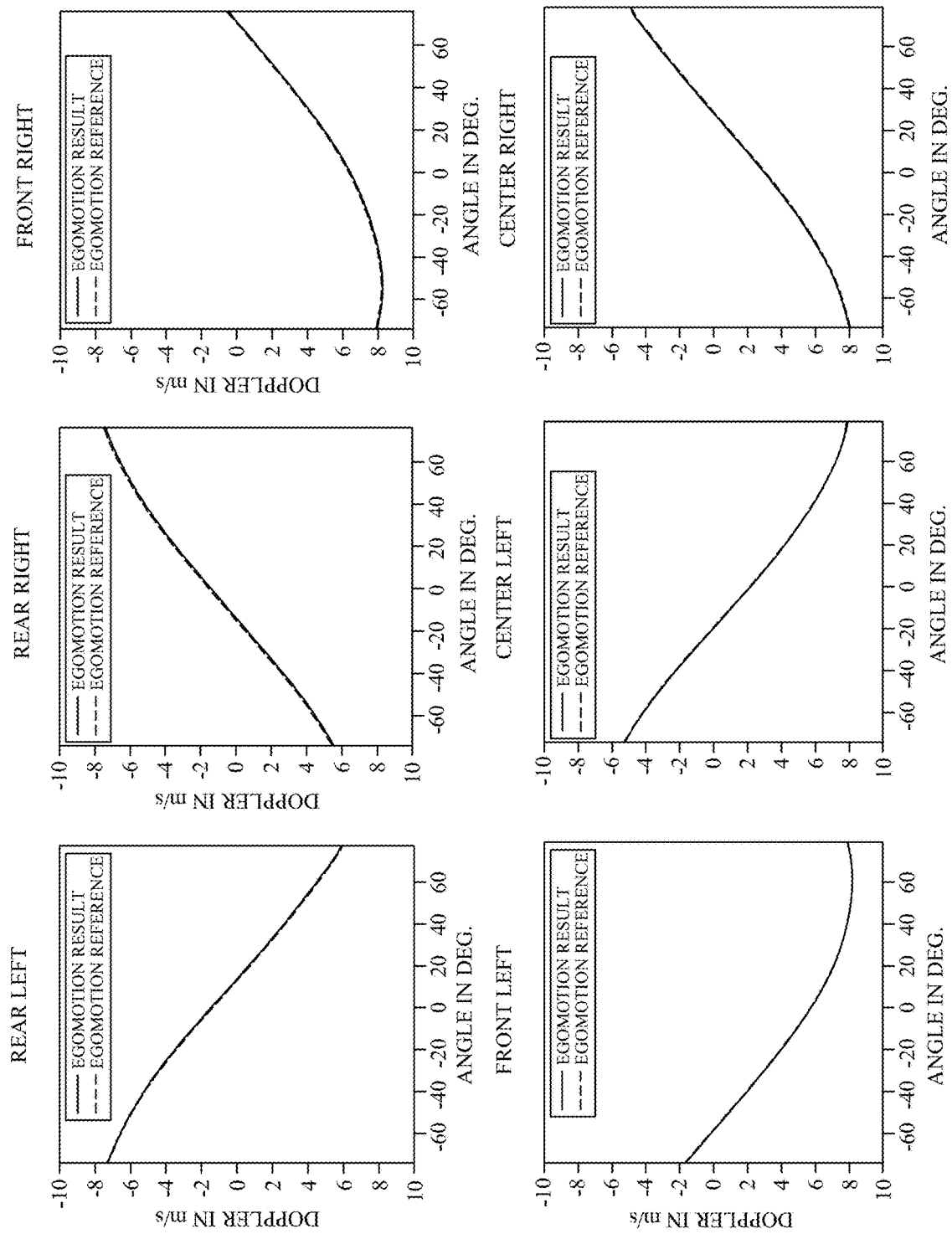
FIG. 9 illustrates an ego-motion curve fitted to each of the six plots in FIG. 8, wherein each curve is fitted using linear least squares estimation in combination with an iterative RANSAC process.

FIG. 9 illustrates, in solid white line, an ego-motion curve fitted to each of the six motion spectrum data S plots in FIG. 8, by using linear least squares estimation in combination with an iterative RANSAC process, as described in relation to FIG. 7. Furthermore, for comparison, each plot in FIG. 9 also shows, in dotted line, an ego-motion curve that is measured by a motion sensor on the vehicle. As shown in FIG. 9, the ego-motion curve that is obtained using the least squares estimation on the motion spectrum data S substantially matches the ego-motion curve measured by the motion sensor.

Figure 10:
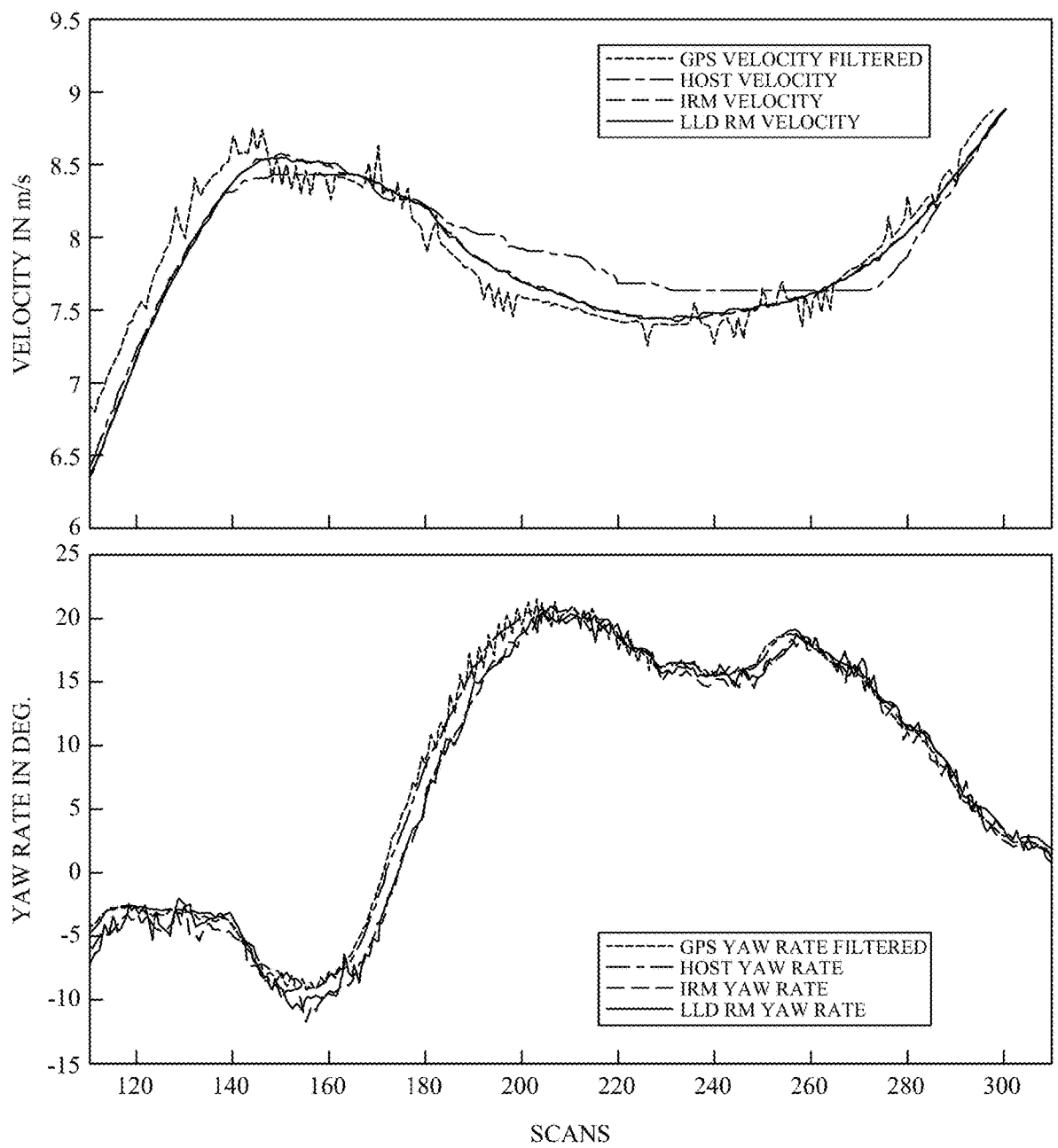
FIG. 10 illustrates a comparison of ego-motion information estimated using linear least squares estimation with ego-motion information obtained using other methods.

FIG. 10 illustrates a comparison of the ego-motion information estimated using linear least squares estimation with ego-motion information obtained via other methods. More specifically, FIG. 10 illustrates a comparison of velocity and yaw rate that are estimated based on linear least squares estimation in combination with an iterative MSAC process (labelled as "LLD RM velocity/yaw rate" in FIG. 10), and velocity and yaw rate obtained using GPS ("GPS filter velocity/yaw rate"), host motion sensor ("host velocity/yaw rate)" and instant radar motion ("IRM velocity/yaw rate").

Figure 11:
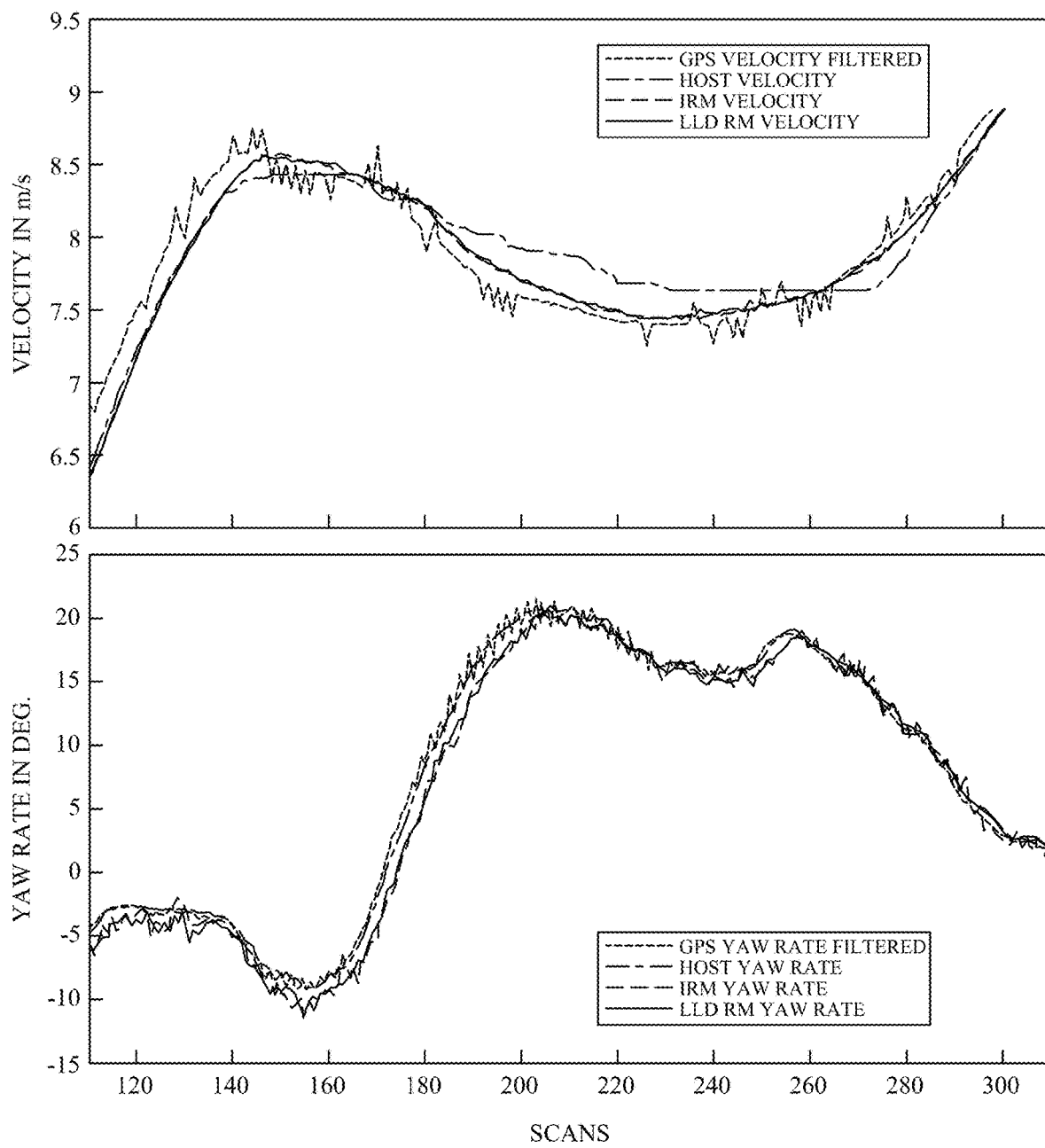
FIG. 11 illustrates a comparison of ego-motion information estimated using the Gauss-Helmert model compared with ego-motion information obtained using other methods.

FIG. 11 illustrates a comparison of ego-motion information estimated using the Gauss-Helmert model compared with ego-motion information obtained via other methods. More specifically, FIG. 11 illustrates a comparison of velocity and yaw rate that are estimated using the aforementioned non-linear Gauss-Helmert model (labelled as "LLD RM velocity/yaw rate" in FIG. 10), and velocity and yaw rate obtained using GPS ("GPS filter velocity/yaw rate"), host motion sensor ("host velocity/yaw rate)" and instant radar motion ("IRM velocity/yaw rate").

Figure 12:
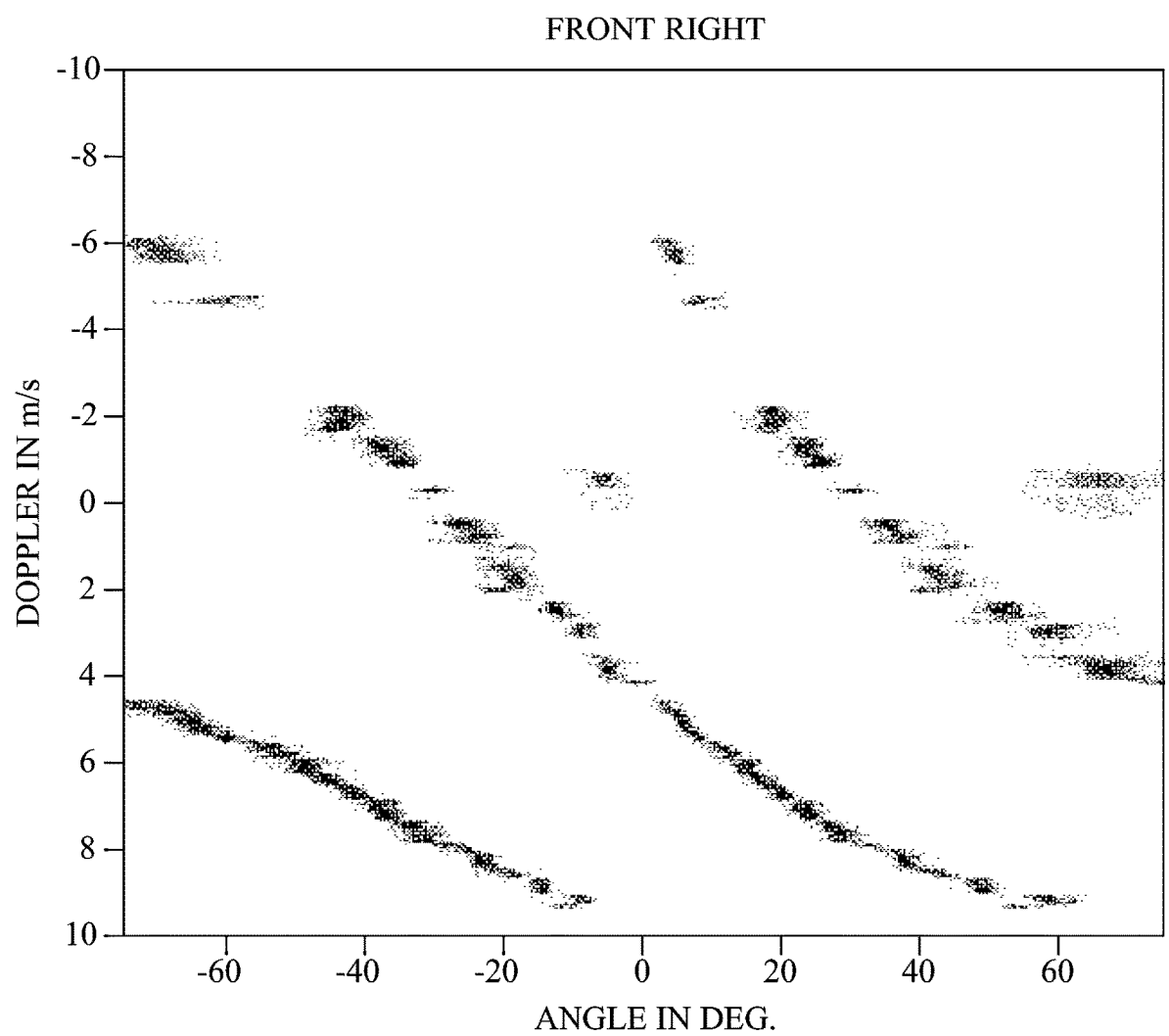
FIG. 12 illustrates a set of motion spectrum data generated from a two-dimensional array having a plurality of sub-arrays.

FIG. 12 illustrates motion spectrum data generated from a two-dimensional array having a plurality of linear sub-arrays. In particular, as the elevation angle is not considered in the generation of the motion spectrum data, the motion spectrum data can also be calculated using each individual sub-array of the two-dimensional array. However, as shown in FIG. 12, in this scenario, for each Doppler bin, an ambiguity exists in the angle measurements, due to the present of two strong peaks corresponding to the two respective curves. To determine vehicle ego-motion from this motion spectrum data, only one of the two curves should be selected and used to estimate the ego-motion parameters using the above-described methods. Furthermore, this ambiguity can be resolved by analyzing known motion behavior or measuring motion from another sensor in order to the select the correct curve.

Figure 13A:
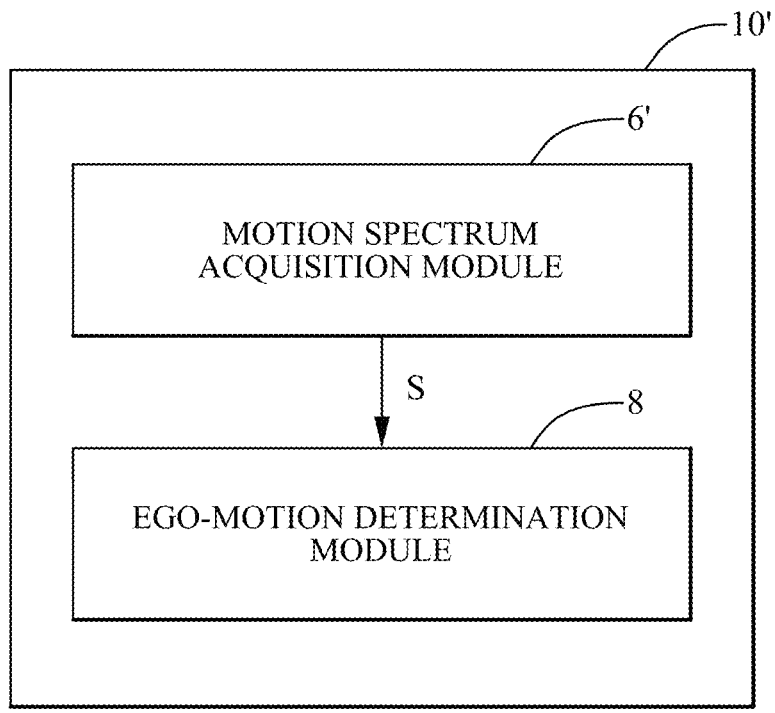
FIG. 13A illustrates a radar data processing apparatus according to a second example embodiment.

Although the ego-motion determination module 8 in FIG. 1A makes use of a set of motion spectrum data S that is generated by the motion spectrum acquisition module 6 using the processes described above with reference to FIG. 3, the motion spectrum acquisition module may instead receive the set of motion spectrum data from an external source. As such, the apparatus 10 need not include the data acquisition module 2 and the Doppler processing module 4 illustrated in FIG. 1A and may have a variant of the motion spectrum acquisition module 6. FIG. 13A illustrates an apparatus 10' according to a second example embodiment, which includes a modified motion spectrum acquisition module 6', as well as the ego-motion determination module 8 of the first example embodiment, but not the data acquisition module 2 and the Doppler processing module 4 of the first example embodiment.

Figure 13B:
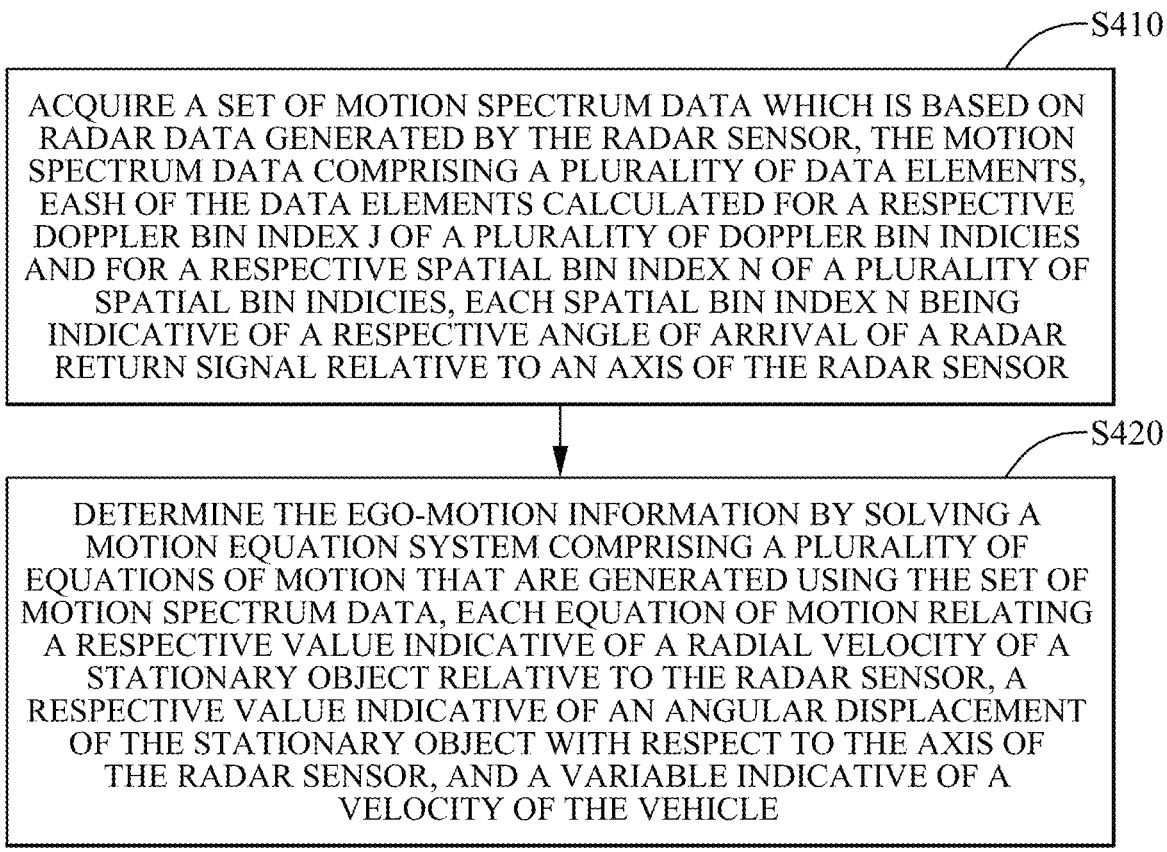
FIG. 13B is a flow diagram illustrating a method by which the radar processing apparatus of the second example embodiment determines ego-motion information of a host vehicle.

FIG. 13B summarizes a method by which radar data processing apparatus 10' of the second example embodiment determines ego-motion information of the vehicle 30.

In step S410 of FIG. 13B, the motion spectrum acquisition module 6' of FIG. 13A acquires a set of motion spectrum data which is based on radar data generated by the radar sensor 20. The motion spectrum data includes a plurality of data elements, each of the data elements calculated for a respective Doppler bin index j of a plurality of Doppler bin indices and for a respective spatial bin index n of a plurality of spatial bin indices. Each spatial bin index n is indicative of a respective angle of arrival of a radar return signal relative to an axis of the radar sensor 20.

In step S420 of FIG. 13B, the ego-motion determination module 8 of FIG. 13A determines the ego-motion information by solving a motion equation system comprising a plurality of equations of motion that are generated using the set of motion spectrum data. Each equation of motion relating a respective value indicative of a radial velocity of a stationary object relative to the radar sensor 20, a respective value indicative of an angular displacement of the stationary object with respect to the axis of the radar sensor 20, and a variable indicative of a velocity of the vehicle 30.

The example aspects described here avoid limitations, specifically rooted in computer technology, relating to estimation of ego-motion information for a moving vehicle which can hinder the performance of various Advance Driving Assistant Systems (ADAS) and autonomous driving applications. In particular, ego-motion measured by an Inertial Measurement Unit (IMU) or estimated using measurements acquired by another type of sensors, such as a camera or radar, often suffer from inherent errors. By virtue of the example aspects described herein, a set of motion spectrum data for estimating vehicle ego-motion information is acquired, and ego-motion information of a vehicle is determined by solving a motion equation system comprising a plurality of equations of motion that are generated using the set of motion spectrum data. Values indicative of radial velocity and angular position in the motion equation system are precalculated based on bin indices of the set of motion spectrum data and are independent of the radar data. As a result, the complexity of determining ego-motion information is reduced since many terms in the motion equation system are precalculated and may only need to be computed once. Furthermore, the use of the set of motion spectrum data allows the determination of ego-motion information without having to first process the radar data for detections in the Doppler-angle domain and then apply angle-finding algorithms on individual beam vectors corresponding to the detections. Estimating the ego-motion information using the set of motion spectrum data can be advantageous as the quality of the estimation is not dependent on the number of individual radar detections. Also, by virtue of the foregoing capabilities of the example aspects described herein, which are rooted in computer technology, the example aspects described herein improve computers and computer processing/functionality, and also improve the field(s) of at least ego-motion determination and various Advance Driving Assistant Systems (ADAS) and autonomous driving applications.

In the foregoing description, example aspects are described with reference to several example embodiments. Accordingly, the specification should be regarded as illustrative, rather than restrictive. Similarly, the figures illustrated in the drawings, which highlight the functionality and advantages of the example embodiments, are presented for example purposes only. The architecture of the example embodiments is sufficiently flexible and configurable, such that it may be utilized (and navigated) in ways other than those shown in the accompanying figures.

Software embodiments of the examples presented herein may be provided as a computer program, or software, such as one or more programs having instructions or sequences of instructions, included, or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine-or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nano systems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the example embodiments described herein. Such software may include without limitation device drivers, operating systems, and user applications. Ultimately, such computer-readable media or storage device(s) further include software for performing example aspects herein, as described above.

Included in the programming and/or software of the system are software modules for implementing the procedures described herein. In some example embodiments herein, a module includes software, although in other example embodiments herein, a module includes hardware, or a combination of hardware and software.

While various example embodiments have been described above, it should be understood that they have been presented by way of example, and not limitation. It will be apparent to persons skilled in the relevant art(s) that various changes in form and detail can be made therein. Thus, the present disclosure should not be limited by any of the above described example embodiments and should not be defined only in accordance with the following claims, but also their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

While this specification contains many specific embodiment details, these should not be construed as limiting, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments and embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements, and features discussed only in connection with one embodiment are not intended to be excluded from a similar role in other embodiments or embodiments.

The apparatus and computer programs described herein may be embodied in other specific forms without departing from the characteristics thereof. The foregoing embodiments are illustrative rather than limiting of the described systems and methods. Scope of the apparatus and computer programs described herein is thus indicated by the appended claims, rather than the foregoing description, and changes that come within the meaning and range of equivalency of the claims are embraced therein.

What is claimed is:

1. A method comprising:
   determining ego-motion information of a vehicle including a radar sensor having a plurality of antenna elements, determining the ego-motion information comprising:
   acquiring a set of motion spectrum data that is based on radar data generated by the radar sensor, the set of motion spectrum data comprising a plurality of data elements, each of the data elements calculated for a respective Doppler bin index of a plurality of Doppler bin indices and for a respective spatial bin index of a plurality of spatial bin indices, each spatial bin index being indicative of a respective angle of arrival of a radar return signal relative to an axis of the radar sensor;

determining the ego-motion information by solving a motion equation system comprising a plurality of equations of motion that are generated using the set of motion spectrum data, each equation of motion relating a respective value indicative of a radial velocity of a stationary object relative to the radar sensor, a respective value indicative of an angular displacement of the stationary object with respect to the axis of the radar sensor, and a variable indicative of a velocity of the vehicle; and using the ego-motion information to control at least one of an Advance Driving Assistant System (ADAS) or an autonomous driving application of the vehicle;

wherein each equation of motion is of a form:

$$d=(-l_y \cos(\theta+\theta_M)+l_x \sin(\theta+\theta_M))\omega+\cos(\theta+\theta_M)v_x+\sin(\theta+\theta_M)v_y$$

wherein d is indicative of a radial velocity of the stationary object, $\theta$ is indicative of an angular displacement of the stationary target relative to the axis of the radar sensor, $\theta_M$ is indicative of a mounting angle of the radar sensor that is an angle between the axis of the radar sensor and an axis of a vehicle coordinate system of the vehicle, $l_x$ is indicative of a mounting position of the radar sensor along an X-axis of the vehicle coordinate system, and $l_y$ is indicative of a mounting position of the radar sensor along a Y-axis of the vehicle coordinate system, $v_x$ is indicative of an X-component of a velocity of the vehicle, and $v_y$ is indicative of a Y-component of the velocity of the vehicle, $\omega$ is indicative of a yaw rate of the vehicle, and the ego-motion information comprises values of $v_x$, $v_y$ and $\omega$.

2. The method according to claim 1, wherein

K is a number of radar sensors each having a plurality of antenna elements mounted at K different positions on the vehicle, K is an integer greater than or equal to two, a respective set of motion spectrum data is acquired for each of the K number of radar sensors, each respective set of motion spectrum data is based on radar data generated by the radar sensor, determining the ego-motion information comprises estimating the values of $v_x$, $v_y$ and $\omega$ by solving the motion equation system:

$$D = H \cdot E$$

$$D = \begin{bmatrix} d_1 \\ d_2 \\ \vdots \\ d_K \end{bmatrix}, H = \begin{bmatrix} M_1 T_1 L_1 \\ M_2 T_2 L_2 \\ \vdots \\ M_K T_K L_K \end{bmatrix}, E = \begin{bmatrix} \omega \\ v_x \\ v_y \end{bmatrix}$$

$$d_k = [d_{k,1}, d_{k,2}, ..., d_{k,F}]^T, k = 1, 2, ..., K,$$

F is an integer equal to or greater than one, $d_{k,1}, d_{k,2} \ldots, d_{k,F}$ are indicative of F radial velocity values that correspond to F respective Doppler bin indices of the k-th set of motion spectrum data acquired for the k-th radar sensor, $M_k$, k=1, 2, ..., K is a F×U dimensional matrix containing data elements of the k-th set of motion spectrum data, U is an integer greater than or equal to one, and the values of F and U are respectively selected for each of k=1, 2, ..., K, each row index of $M_k$ corresponds to a respective Doppler bin index of the k-th set of motion spectrum data, and each column index of $M_k$ corresponds to a respective spatial bin index of the k-th set of motion spectrum data, each row of $M_k$ comprises data elements for the corresponding Doppler bin index of the k-th set of motion spectrum data, $$T_k = \begin{bmatrix} \cos(\theta_{k,1} + \theta_k^M) & \sin(\theta_{k,1} + \theta_k^M) \\ \cos(\theta_{k,2} + \theta_k^M) & \sin(\theta_{k,2} + \theta_k^M) \\ \cos(\theta_{k,U} + \theta_k^M) & \sin(\theta_{k,U} + \theta_k^M) \end{bmatrix}, k = 1, 2, ..., K,$$

$\theta_{k,1}, \theta_{k,2} \ldots, \theta_{k,U}$, u=1, 2, ..., U are indicative of U angle values that respectively correspond to U spatial bin indices of the k-th set of motion spectrum data, $\theta_k^M$ is indicative of the mounting angle for the k-th radar sensor that is an angle between an axis of the k-th radar sensor and an axis of the vehicle coordinate system of the vehicle, $$L_k = \begin{bmatrix} -l_k^y & 1 & 0 \\ l_k^x & 0 & 1 \end{bmatrix}, k = 1, 2, ...,$$

K is a model matrix for the k-th radar sensor, $l_k^x$ is indicative of a mounting position of the k-th radar sensor along the X-axis of the vehicle coordinate system, and $l_k^y$ is indicative of a mounting position of the k-th radar sensor along the Y-axis of the vehicle coordinate system.

3. The method according to claim 1, wherein each equation of motion is given by:

$$d=\cos(\theta+\theta^M)v_x^s+\sin(\theta+\theta^M)v_y^s$$

wherein d is indicative of a radial velocity of the stationary object, $\theta$ is indicative of an angular displacement of the stationary target relative to the axis of the radar sensor, $\theta^M$ is indicative of an angle between the axis of the radar sensor and an axis of a vehicle coordinate system of the vehicle, $v_x^s$ is indicative of an X-component of a velocity of the radar sensor, and $v_y^s$ is indicative of a Y-component of the velocity of the radar sensor, the ego-motion information comprises setting values $v_x=v_x^s$ and $v_y=v_y^s$ when a yaw rate of the vehicle is zero, wherein $v_x$ is indicative of an X-component of a velocity of the vehicle, and $v_y$ is indicative of a Y-component of the velocity of the vehicle, K is a number of radar sensors each having a plurality of antenna elements mounted at K different positions on the vehicle, K is an integer greater than or equal to one, and wherein a respective set of motion spectrum data is acquired for each of the K number of radar sensors, each respective set of motion spectrum data is based on radar data generated by the radar sensor, determining the ego-motion information comprises estimating the values of $v_x^s$ and $v_y^s$ and setting $v_x=v_x^s$ and $v_y=v_y^s$, estimating the values of $v_x^s$ and $v_y^s$ comprises solving the motion equation system:

$$D = H \cdot E$$

$$D = \begin{bmatrix} d_1 \\ d_2 \\ \vdots \\ d_K \end{bmatrix}, H = \begin{bmatrix} M_1 T_1 \\ M_2 T_2 \\ \vdots \\ M_K T_K \end{bmatrix}, E = \begin{bmatrix} v_x^s \\ v_y^s \end{bmatrix}$$

$$d_k = [d_{k,1}, d_{k,2}, d_{k,F}]^T, k = 1, 2, \ldots, K,$$

F is an integer equal to or greater than one, and $d_{k,1}, d_{k,2} \ldots, d_{k,F}$ are indicative of F radial velocity values that correspond to F respective Doppler bin indices of the k-th set of motion spectrum data that is acquired for the k-th radar sensor, $M_k$, k=1, 2, . . . , K is a F×U dimensional matrix containing data elements of the k-th set of motion spectrum data, wherein U is an integer greater than or equal to one, and the values of F and U are respectively selected for each of k=1, 2, . . . , K, each row index of $M_k$ corresponds to a respective Doppler bin index of the k-th set of motion spectrum data, each column index of $M_k$ corresponds to a respective spatial bin index of the k-th set of motion spectrum data, each row of $M_k$ comprises data elements for the corresponding Doppler bin index of the k-th set of motion spectrum data, $$T_k = \begin{bmatrix} \cos(\theta_{k,1} + \theta_k^M) & \sin(\theta_{k,1} + \theta_k^M) \\ \cos(\theta_{k,2} + \theta_k^M) & \sin(\theta_{k,2} + \theta_k^M) \\ \cos(\theta_{k,U} + \theta_k^M) & \sin(\theta_{k,U} + \theta_k^M) \end{bmatrix}, k = 1, 2, \ldots, K,$$

$\theta_{k,1}, \theta_{k,2} \ldots, \theta_{k,U}$, u=1, 2, . . . , U are indicative of U angle values that respectively correspond to U spatial bin indices of the k-th set of motion spectrum data, and $\theta_k^M$ is indicative of the mounting angle for the k-th radar sensor that is an angle between an axis of the k-th radar sensor and an axis of the vehicle coordinate system of the vehicle.

4. The method according to claim 1, wherein each equation of motion is given by:

$$d=(-l_y \cos(\theta+\theta^M)+l_x \sin(\theta+\theta^M))\omega+\cos(\theta+\theta^M)v_x$$

wherein d is indicative of a radial velocity of the stationary object,

θ is indicative of an angular displacement of the stationary target relative to the axis of the radar sensor, $\theta^M$ is indicative of an angle between the axis of the radar sensor and an axis of a vehicle coordinate system of the vehicle, $l_x$ is indicative of a mounting position of the radar sensor along an X-axis of the vehicle coordinate system, $l_y$ is indicative of a mounting position of the radar sensor along a Y-axis of the vehicle coordinate system, ω is indicative of a yaw rate of the vehicle, $v_x$ is an X-component of a velocity of the vehicle, ego-motion information comprises values ω and $v_x$, K is a number of radar sensors each having a plurality of antenna elements mounted at K different positions on the vehicle, K is an integer greater than or equal to one, a respective set of motion spectrum data is acquired for each of the K number of radar sensors, each respective set of motion spectrum data is based on radar data generated by the radar sensor, and determining the ego-motion information comprises estimating the values ω and $v_x$ by solving the motion equation system:

$$D = H \cdot E$$

$$D = \begin{bmatrix} d_1 \\ d_2 \\ \vdots \\ d_K \end{bmatrix}, H = \begin{bmatrix} M_1 T_1 L_1 \\ M_2 T_2 L_2 \\ \vdots \\ M_K T_K L_K \end{bmatrix}, E = \begin{bmatrix} \omega \\ v_x \end{bmatrix}$$

$d_k=[d_{k,1}, d_{k,2} \ldots, d_{k,F}]^T$, k=1, 2, . . . , K, F is an integer equal to or greater than 1, $d_{k,1}, d_{k,2} \ldots, d_{k,F}$ are indicative of F radial velocity values that correspond to F respective Doppler bin indices of the k-th set of motion spectrum data that is acquired for the k-th radar sensor, $M_k$, k=1, 2, . . . , K is a F×U dimensional matrix containing data elements of the k-th set of motion spectrum data, U is an integer greater than or equal to one, and the values of F and U are respectively selected for each of k=1, 2, . . . , K, each row index of $M_k$ corresponds to a respective Doppler bin index of the k-th set of motion spectrum data, each column index of $M_k$ corresponds to a respective spatial bin index of the k-th set of motion spectrum data, each row of $M_k$ comprises data elements for the corresponding Doppler bin index of the k-th set of motion spectrum data, $$T_k = \begin{bmatrix} \cos(\theta_{k,1} + \theta_k^M) & \sin(\theta_{k,1} + \theta_k^M) \\ \cos(\theta_{k,2} + \theta_k^M) & \sin(\theta_{k,2} + \theta_k^M) \\ \cos(\theta_{k,U} + \theta_k^M) & \sin(\theta_{k,U} + \theta_k^M) \end{bmatrix}, k = 1, 2, \ldots, K,$$

$\theta_{k,1}, \theta_{k,2} \ldots, \theta_{k,U}$, u=1, 2, . . . , U are indicative of U angle values that respectively correspond to U respective spatial bin indices of the k-th set of motion spectrum data, $\theta_k^M$ is indicative of the mounting angle for the k-th radar sensor that is an angle between the axis of the k-th radar sensor and an axis of the vehicle coordinate system of the vehicle, $$L_k = \begin{bmatrix} -l_k^y & 1 \\ l_k^x & 0 \end{bmatrix}, k = 1, 2, \ldots,$$

K is a model matrix for the k-th radar sensor, $l_k^x$ is indicative of a mounting position of the k-th radar sensor along an X-axis of the vehicle coordinate system, and $l_k^y$ is indicative of a mounting position of the k-th radar sensor along a Y-axis of the vehicle coordinate system.

5. The method according to claim 2, wherein a linear least squares estimation method is used to solve the motion equation system to determine the ego-motion information.

6. The method according to claim 5, wherein the ego-motion information is determined by:
randomly selecting from the Doppler bin indices of the K sets of motion spectrum data, a plurality of subsets of Doppler bin indices;
performing, for each subset of Doppler bin indices of the plurality of subsets of Doppler bin indices, processes of:
estimating the ego-motion information by solving the motion equation system D=H·E using the linear least squares estimation method by setting $d_{k,1}$, $d_{k,2}$ ..., $d_{k,F}$ for k=1, 2, ..., K to radial velocity values that correspond to respective Doppler bin indices of the k-th set of motion spectrum data that are in the subset of Doppler bin indices;
setting each row of $M_k$ to data elements of a respective Doppler bin index of the k-th set of motion spectrum data that is in the subset of Doppler bin indices; and
determining an error of the estimation for each Doppler bin index of the subset of Doppler bin indices;
categorizing each Doppler bin index of the subset of Doppler bin indices as being one of an inlier Doppler bin index and an outlier Doppler bin index based on the determined error of estimation;
selecting a subset of Doppler bin indices from the plurality of subsets of Doppler bin indices based on one of
a number of inlier Doppler bin indices for each subset of Doppler bin indices, and
a sum of the error of estimation for all inlier Doppler bin indices determined for each subset of Doppler bin indices; and
determining the ego-motion information using the linear least squares estimation method to solve the motion equation system D=H·E, by setting $d_{k,1}$, $d_{k,2}$ ..., $d_{k,F}$ for k=1, 2, ..., K to radial velocity values that correspond to respective Doppler bin indices of the k-th set of motion spectrum data that are categorized as an inlier Doppler bin index in the selected subset of Doppler bin indices, and by further setting each row of $M_k$, for k=1, 2, ..., K to data elements of a respective Doppler bin index of the k-th set of motion spectrum data that is categorized as an inlier Doppler bin index in the selected subset of Doppler bin indices.

7. The method according to claim 1, further comprising:
receiving radar data comprising a respective plurality of data samples for each of a plurality of radar return signals received at each of the antenna elements of the radar sensor;
processing the data samples to generate, for each of the antenna elements, respective Doppler-processed data comprising one of:
a plurality of data values, each of the data values calculated for a respective range bin index of a plurality of range bin indices, and for a respective Doppler bin index of the plurality of Doppler bin indices; and
a plurality of data values, each of the data values calculated for a respective fast-time index of a plurality of fast-time indices, and for a respective Doppler bin index of the plurality of Doppler bin indices,
wherein the set of motion spectrum data is acquired by performing, for each Doppler bin index of the plurality of Doppler bin indices, processes of:
selecting data values of the Doppler-processed data that have been calculated for the Doppler bin index;
calculating a covariance matrix using the data values selected for the Doppler bin index; and
applying a spectral estimation algorithm that uses the covariance matrix to determine, for the Doppler bin index, a respective spatial spectrum value for each of the plurality of spatial bin indices.

8. The method according to claim 7, wherein
each of the data values of the Doppler-processed data is calculated for a respective range bin index of a plurality of range bin indices, and for a respective Doppler bin index of a plurality of Doppler bin indices, and wherein the data values selected for each Doppler bin index define a R×I dimensional matrix comprising data values calculated for R antenna elements and I range bin indices for the Doppler bin index, and wherein the covariance matrix is a R×R dimensional matrix determined from the R×I dimensional matrix using a product of the R×I dimensional matrix and a conjugate transpose of the R×I dimensional matrix, or
each of the data values of the Doppler-processed data is calculated for a respective fast-time index of a plurality of fast-time indices, and a respective Doppler bin index of a plurality of Doppler bin indices, and wherein the data values selected for each Doppler bin index define a R×I dimensional matrix that comprises data values calculated for R antenna elements and I fast-time indices for the Doppler bin index, and wherein the covariance matrix is a R×R dimensional matrix determined from the R×I dimensional matrix using a product of the R×I dimensional matrix and a conjugate transpose of the R×I dimensional matrix.

9. The method according to claim 7, wherein generating the set of motion spectrum data further comprises normalizing the spatial spectrum values determined for each Doppler bin index to generate a respective plurality of normalized spatial spectrum values, each of the normalized spatial spectrum values being generated for a respective Doppler bin index of the plurality of Doppler bin indices and for a respective spatial bin index of a plurality of spatial bin indices.

10. The method according to claim 9, wherein generating the set of motion spectrum data further comprises:
calculating, for each Doppler bin index of the plurality of Doppler bin indices, data indicative of a variance of a probability distribution of the angle of arrival of the radar return signal relative to the axis of the radar sensor among the angles of arrival indicated by the respective spatial bin indices, by using the normalized spatial spectrum values generated for the spatial bin indices as probability values for the spatial bin indices; and
determining a subset of Doppler bin indices of the plurality of Doppler bin indices for which the calculated variance is below a predetermined threshold,
wherein the value of each data element of the set of motion spectrum data is based on a respective normalized spatial spectrum value that has been generated for a Doppler bin index in the subset of Doppler bin indices and for a spatial bin index corresponding to the data element.

11. The method according to claim 10, wherein values of data elements of the set of motion spectrum data are generated for each Doppler bin index in the subset of Doppler bin indices by processing the plurality of normalized spatial spectrum values generated for the Doppler bin index by:

identifying a spatial bin index for which the normalized spatial spectrum value is highest among the normalized spatial spectrum values generated for the plurality of spatial bin indices;

setting the value of a data element for the identified spatial bin index to a non-zero value; and setting the value of data elements for all other spatial bin indices to zero.

12. The method according to claim 9, wherein values of data elements of the set of motion spectrum data are generated for each Doppler bin index in the plurality of Doppler bin indices by processing the plurality of normalized spatial spectrum values generated for the Doppler bin index by:

identifying a spatial bin index for which the normalized spatial spectrum value is highest among the normalized spatial spectrum values generated for the plurality of spatial bin indices;

setting the value of a data element for the identified spatial bin index to a non-zero value; and setting the value of data elements for all other spatial bin indices to zero.

13. The method according to claim 9, wherein determining the ego-motion information comprises solving the motion equation system using a least square adjustment method, wherein the least square adjustment method performs at least one iteration of an iterative process where an increment to an estimate of the ego-motion information is calculated in each iteration of the iterative process to obtain an updated estimate that is based on the estimate and the increment and used to calculate an increment in a next iteration of the iterative process, wherein the increment is calculated using a first set of values for the set of motion spectrum data, each value of the first set of values being indicative of a variance of the distribution of the angle of arrival among the angles of arrival indicated by the respective spatial bin indices for a Doppler bin index of the set of motion spectrum data, wherein each value of the first set is calculated using the normalized spatial spectrum values corresponding to the plurality of spatial bin indices for the Doppler bin index as respective probability values for the plurality of spatial bin indices, and a second set of values for the set of motion spectrum data, each value of the second set indicative of a variance of the distribution of the radial velocity among the radial velocities indicated by the respective Doppler bin indices for a spatial bin index of the set of motion spectrum data, wherein each value of the second set of values is calculated using the normalized spatial spectrum corresponding to the plurality of Doppler bins for the spatial bin index as respective probability values for the plurality of Doppler bin indices.

14. A radar data processing apparatus arranged to determine ego-motion information of a vehicle and to controll at least one of an Advance Driving Assistant System (ADAS) or an autonomous driving application of the vehicle, the radar data processing apparatus comprising a radar sensor having a plurality of antenna elements, the radar data apparatus comprising:

a motion spectrum acquisition module arranged to acquire a set of motion spectrum data that is based on radar data generated by the radar sensor, the set of motion spectrum data comprising a plurality of data elements, each of the data elements calculated for a respective Doppler bin index of a plurality of Doppler bin indices and for a respective spatial bin index of a plurality of spatial bin indices, each spatial bin index being indicative of a respective angle of arrival of a radar return signal relative to an axis of the radar sensor; and an ego-motion information determination module arranged to determine the ego-motion information by solving a motion equation system comprising a plurality of equations of motion that are generated using the set of motion spectrum data, each equation of motion relating a respective value indicative of a radial velocity of a . stationary object relative to the radar sensor, a respective value indicative of an angular displacement of the stationary object with respect to an axis of the radar sensor, and a variable indicative of a velocity of the vehicle;

wherein each equation of motion is of a form:

$$d = (-l_y \cos(\theta+\theta_M) + l_x \sin(\theta+\theta_M))\omega + \cos(\theta+\theta_M)v_x + \sin(\theta+\theta_M)v_y$$

wherein d is indicative of a radial velocity of the stationary object, $\theta$ is indicative of an angular displacement of the stationary target relative to the axis of the radar sensor, $\theta^M$ is indicative of a mounting angle of the radar sensor that is an angle between the axis of the radar sensor and an axis of a vehicle coordinate system of the vehicle, $l_x$ is indicative of a mounting position of the radar sensor along an X-axis of the vehicle coordinate system, and $l_y$ is indicative of a mounting position of the radar sensor along a Y-axis of the vehicle coordinate system, $v_x$ is indicative of an X-component of a velocity of the vehicle, and $v_y$ is indicative of a Y-component of the velocity of the vehicle, $\omega$ is indicative of a yaw rate of the vehicle, and the ego-motion information comprises values of $v_x$, $v_y$ and $\omega$.

15. A non-tranistory computer-readable storage media comprising instructions that, when executed, cause a processor to:

determine ego-motion information of a vehicle including a radar sensor having a plurality of antenna elements, determining the ego-motion information comprising:

acquire a set of motion spectrum data that is based on radar data generated by the radar sensor, the set of motion spectrum data comprising a plurality of data elements, each of the data elements calculated for a respective Doppler bin index of a plurality of Doppler bin indices and for a respective spatial bin index of a plurality of spatial bin indices, each spatial bin index being indicative of a respective angle of arrival of a radar return signal relative to an axis of the radar sensor;

determine the ego-motion information by solving a motion equation system comprising a plurality of equations of motion that are generated using the set of motion spectrum data, each equation of motion relating a respective value indicative of a radial velocity of a stationary object relative to the radar sensor, a respective value indicative of an angular displacement of the stationary object with respect to the axis of the radar sensor, and a variable indicative of a velocity of the vehicle;

use the ego-motion information to control at least one of an Advance Driving Assistant System (ADAS) or an autonomous driving application of the vehicle;

wherein each equation of motion is of a form:

$$d=(-l_y \cos(\theta+\theta_M)+l_x \sin(\theta+\theta_M))\omega+\cos(\theta+\theta_M)v_x+\sin(\theta+\theta_M)v_y$$

wherein d is indicative of a radial velocity of the stationary object,

θ is indicative of an angular displacement of the stationary target relative to the axis of the radar sensor, $\theta^M$ is indicative of a mounting angle of the radar sensor that is an angle between the axis of the radar sensor and an axis of a vehicle coordinate system of the vehicle, $l_x$ is indicative of a mounting position of the radar sensor along an X-axis of the vehicle coordinate system, and $l_y$ is indicative of a mounting position of the radar sensor along a Y-axis of the vehicle coordinate system, $v_x$ is indicative of an X-component of a velocity of the vehicle, and $v_y$ is indicative of a Y-component of the velocity of the vehicle, ω is indicative of a yaw rate of the vehicle, and the ego-motion information comprises values of $v_x$, $v_y$ and ω.

16. The non-transitory computer-readable storage media according to claim 15, wherein the instructions, when executed, further cause the processor to:

receive radar data comprising a respective plurality of data samples for each of a plurality of radar return signals received at each of the antenna elements of the radar sensor;

process the data samples to generate, for each of the antenna elements, respective Doppler-processed data comprising one of:

a plurality of data values, each of the data values calculated for a respective range bin index of a plurality of range bin indices, and for a respective Doppler bin index of the plurality of Doppler bin indices; and a plurality of data values, each of the data values calculated for a respective fast-time index of a plurality of fast-time indices, and for a respective Doppler bin index of the plurality of Doppler bin indices, wherein the set of motion spectrum data is acquired by performing, for each Doppler bin index of the plurality of Doppler bin indices, processes of:

selecting data values of the Doppler-processed data that have been calculated for the Doppler bin index;

calculating a covariance matrix using the data values selected for the Doppler bin index; and applying a spectral estimation algorithm that uses the covariance matrix to determine, for the Doppler bin index, a respective spatial spectrum value for each of the plurality of spatial bin indices.

17. The non-transitory computer-readable storage media according to claim 16, wherein each of the data values of the Doppler-processed data is calculated for a respective range bin index of a plurality of range bin indices, and for a respective Doppler bin index of a plurality of Doppler bin indices, and wherein the data values selected for each Doppler bin index define a R×I dimensional matrix comprising data values calculated for R antenna elements and I range bin indices for the Doppler bin index, and wherein the covariance matrix is a R×R dimensional matrix determined from the R×I dimensional matrix using a product of the R×I dimensional matrix and a conjugate transpose of the R×I dimensional matrix, or each of the data values of the Doppler-processed data is calculated for a respective fast-time index of a plurality of fast-time indices, and a respective Doppler bin index of a plurality of Doppler bin indices, and wherein the data values selected for each Doppler bin index define a R×I dimensional matrix that comprises data values calculated for R antenna elements and I fast-time indices for the Doppler bin index, and wherein the covariance matrix is a R×R dimensional matrix determined from the R×I dimensional matrix using a product of the R×I dimensional matrix and a conjugate transpose of the R×I dimensional matrix.

18. The non-transitory computer-readable storage media according to claim 16, wherein the set of motion spectrum data is generated further by normalizing the spatial spectrum values determined for each Doppler bin index to generate a respective plurality of normalized spatial spectrum values, each of the normalized spatial spectrum values being generated for a respective Doppler bin index of the plurality of Doppler bin indices and for a respective spatial bin index of a plurality of spatial bin indices.

19. The non-transitory computer-readable storage media according to claim 16, wherein the set of motion spectrum data is generated by:

calculating, for each Doppler bin index of the plurality of Doppler bin indices, data indicative of a variance of a probability distribution of the angle of arrival of the radar return signal relative to the axis of the radar sensor among the angles of arrival indicated by the respective spatial bin indices, by using the normalized spatial spectrum values generated for the spatial bin indices as probability values for the spatial bin indices; and determining a subset of Doppler bin indices of the plurality of Doppler bin indices for which the calculated variance is below a predetermined threshold, wherein the value of each data element of the set of motion spectrum data is based on a respective normalized spatial spectrum value that has been generated for a Doppler bin index in the subset of Doppler bin indices and for a spatial bin index corresponding to the data element.

* * * * *

UNITED STATES PATENT AND TRADEMARK OFFICE
CERTIFICATE OF CORRECTION

PATENT NO. : 12,130,353 B2  
APPLICATION NO. : 17/588049  
DATED : October 29, 2024  
INVENTOR(S) : Stephanie Lessmann Page 1 of 2

It is certified that error appears in the above-identified patent and that said Letters Patent is hereby corrected as shown below:

In the Claims

Column 34, Claim 2, Lines 17-20: delete "
$$T_k = \begin{bmatrix} cos(\theta_{k,1} + \theta_k^M) & sin(\theta_{k,1} + \theta_k^M) \\ cos(\theta_{k,2} + \theta_k^M) & sin(\theta_{k,2} + \theta_k^M) \\ cos(\theta_{k,U} + \theta_k^M) & sin(\theta_{k,2} + \theta_k^M) \end{bmatrix},$$
" and insert --
$$T_k = \begin{bmatrix} cos(\theta_{k,1} + \theta_k^M) & sin(\theta_{k,1} + \theta_k^M) \\ cos(\theta_{k,2} + \theta_k^M) & sin(\theta_{k,2} + \theta_k^M) \\ \vdots & \vdots \\ cos(\theta_{k,U} + \theta_k^M) & sin(\theta_{k,2} + \theta_k^M) \end{bmatrix},$$
--

Column 35, Claim 3, Lines 37-41: delete "
$$T_k = \begin{bmatrix} cos(\theta_{k,1} + \theta_k^M) & sin(\theta_{k,1} + \theta_k^M) \\ cos(\theta_{k,2} + \theta_k^M) & sin(\theta_{k,2} + \theta_k^M) \\ cos(\theta_{k,U} + \theta_k^M) & sin(\theta_{k,2} + \theta_k^M) \end{bmatrix},$$
" and insert --
$$T_k = \begin{bmatrix} cos(\theta_{k,1} + \theta_k^M) & sin(\theta_{k,1} + \theta_k^M) \\ cos(\theta_{k,2} + \theta_k^M) & sin(\theta_{k,2} + \theta_k^M) \\ \vdots & \vdots \\ cos(\theta_{k,U} + \theta_k^M) & sin(\theta_{k,2} + \theta_k^M) \end{bmatrix},$$
--

Column 35, Claim 4, Line 67: before "ego-motion", insert --the--

Column 36, Claim 4, Lines 44-47: delete "
$$T_k = \begin{bmatrix} cos(\theta_{k,1} + \theta_k^M) & sin(\theta_{k,1} + \theta_k^M) \\ cos(\theta_{k,2} + \theta_k^M) & sin(\theta_{k,2} + \theta_k^M) \\ cos(\theta_{k,U} + \theta_k^M) & sin(\theta_{k,2} + \theta_k^M) \end{bmatrix},$$
" and insert Signed and Sealed this  
Twenty-seventh Day of May, 2025

Coke Morgan Stewart  
*Acting Director of the United States Patent and Trademark Office*

$$T_k = \begin{bmatrix} \cos(\theta_{k,1} + \theta_k^M) & \sin(\theta_{k,1} + \theta_k^M) \\ \cos(\theta_{k,2} + \theta_k^M) & \sin(\theta_{k,2} + \theta_k^M) \\ \vdots & \vdots \\ \cos(\theta_{k,U} + \theta_k^M) & \sin(\theta_{k,2} + \theta_k^M) \end{bmatrix},$$

Column 39, Claim 14, Line 57: delete "controll" and insert --control--

Column 40, Claim 14, Line 12: delete "a . stationary" and insert --a stationary--

Column 40, Claim 14, Line 26: delete "θ$^M$" and insert --θ$_M$--

Column 40, Claim 15, Line 39: delete "non-tranistory" and insert --non-transitory--

Column 40, Claim 15, Line 54: after "vehicle;", insert --and--

Column 41, Claim 15, Line 8: delete "θ$^M$" and insert --θ$_M$--

Column 42, Claim 19, Lines 32-33: delete "a ccording" and insert --according--